(12) United States Patent
Mitsutake et al.

(10) Patent No.: US 8,705,081 B2
(45) Date of Patent: Apr. 22, 2014

(54) SYSTEM AND METHOD FOR INCLUDING INPUT METHOD INFORMATION ON A PRINTED DOCUMENT

(75) Inventors: Katsuya Mitsutake, Kanagawa (JP); Hitoshi Miura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1068 days.

(21) Appl. No.: 11/939,026

(22) Filed: Nov. 13, 2007

(65) Prior Publication Data

US 2008/0117461 A1    May 22, 2008

(30) Foreign Application Priority Data

Nov. 22, 2006  (JP) ................................ 2006-315428
Jul. 20, 2007   (JP) ................................ 2007-189230

(51) Int. Cl.
*G06F 15/00*  (2006.01)
*G06K 1/00*   (2006.01)
*G06F 3/12*   (2006.01)

(52) U.S. Cl.
USPC ........................................ 358/1.15; 358/1.9

(58) Field of Classification Search
None
See application file for complete search history.

(56) References Cited

U.S. PATENT DOCUMENTS

| 6,711,292 | B2 * | 3/2004 | Wang ............................ 382/199 |
| 2001/0019420 | A1 | 9/2001 | Sanbongi et al. |
| 2004/0061906 | A1 * | 4/2004 | Rikima ........................ 358/474 |
| 2004/0070787 | A1 * | 4/2004 | Hsu et al. ..................... 358/1.15 |
| 2004/0150855 | A1 | 8/2004 | Tonegawa |
| 2004/0216058 | A1 * | 10/2004 | Chavers et al. ............... 715/810 |
| 2005/0068576 | A1 | 3/2005 | Tonegawa |
| 2005/0219616 | A1 * | 10/2005 | Furuta et al. ................. 358/1.18 |
| 2006/0173998 | A1 * | 8/2006 | Ohara .......................... 709/224 |

FOREIGN PATENT DOCUMENTS

| JP | 10243263 A | 9/1998 |
| JP | 2000132561 A | 5/2000 |
| JP | 2001076090 A | 3/2001 |
| JP | 2003281152 A | 10/2003 |
| JP | 2004104713 A | 4/2004 |
| JP | 2004104757 A | 4/2004 |
| JP | 2004227247 A | 8/2004 |
| JP | 2005086564 A | 3/2005 |

(Continued)

OTHER PUBLICATIONS

Japanese Decision of Rejection mailed on Aug. 28, 2012 and partial English translation thereof, issued in connection with corresponding JP Patent Application No. 2007-189230.

(Continued)

*Primary Examiner* — Ming Hon
(74) *Attorney, Agent, or Firm* — Gesmer Updegrove LLP

(57) ABSTRACT

There is provided a print medium processing system including an identification information generating unit that receives input method information which is referred to when image data is inputted to an application which processes the image data, and generates identification information for the received input method information, an information memory that stores the generated identification information in a manner associated with the input method information, a printing unit that adds the identification information of the input method information to image data to be printed, and prints the image data, a reading unit that reads image data printed in a print medium, an extracting unit that extracts the identification information from the image data, an obtaining unit that obtains the input method information specified by the identification information extracted from the information memory, and a transferring unit that transfers the image data to an application specified from the input method information.

17 Claims, 29 Drawing Sheets

(56) References Cited

FOREIGN PATENT DOCUMENTS

| JP | 2005122682 | | 5/2005 |
|----|------------|---|---------|
| JP | 2005311990 | A | 11/2005 |
| JP | 2006041624 | A | 2/2006 |
| JP | 2006042216 | A | 2/2006 |

OTHER PUBLICATIONS

Japanese Notice of Grounds for Rejection mailed on Feb. 14, 2012 and partial English translation thereof, issued in connection with corresponding JP Patent Application No. 2007-189230.

* cited by examiner

| INFORMATION ID (hex) | INPUT DESTINATION ADDRESS | PROTOCOL | ERROR PROCESSING METHOD |
|---|---|---|---|
| C589EFE0-AF2E-432C-A6C1-AEEAB4BEFBB8 | 123.456.789.012 ¥d¥data¥a | http | THREE TIMES RETRIES |
| FF432CE0-AF2E-492C-B6C5-AEEAB4BEFBB8 | 456.789.012.123 ¥h¥image¥zzz | soap | SUSPEND AND NOTIFY admin@fx.co.jp OF ERROR MAIL |
| EAB4A6C1-AF2E-632C-C6C1-AEEAB4BEFBB8 | ftp://sever.fx.co.jp/dirB | | CHANGE TO ftp://backup.server.fx.co.jp/dirC |

XXX PRACTICE ANSWER FORM

MATRICULATION NUMBER

NAME

CLASS DATE

MARKS

PRACTICE 1

QUESTIONNAIRE ☐ EXCELLENT UNDER-STANDING ☐ GOOD UNDER-STANDING ☐ NORMAL UNDER-STANDING ☐ BAD UNDER-STANDING ☐ WORST UNDER-STANDING

INSTRUCTOR USE ONLY ☐ ☐ ☐

Fig. 10

| INFORMATION ID(hex) | INPUT DESTINATION ADDRESS | PROTOCOL | ERROR PROCESSING METHOD |
|---|---|---|---|
| C589EFE0-AF2E-432C-A6C1-AEEAB4BEFBB8 | 123.456.789.012 ¥d¥data¥a | http | THREE TIMES RETRIES |
| | 456.789.012.123 ¥h¥image¥zzz | soap | SUSPEND AND NOTIFY admin@fx.co.jp OF ERROR MAIL |
| | ftp://sever.fx.co.jp/dirB | | CHANGE TO ftp://backup.server.fx.co.jp/dirC |

Fig. 20

| INFORMATION ID (hex) | INPUT METHOD INFORMATION | | | ATTRIBUTE DATA |
|---|---|---|---|---|
| | INPUT DESTINATION ADDRESS | PROTO-COL | ERROR PROCESSING METHOD | |
| C589EFE0-AF2E-432C-A6C1-AEEAB4BEFBB8 | 123.456.789.012 ¥d¥data¥a | http | THREE TIMES RETRIES | FILE NAME: "BUSINESS STRATEGY A_image" <br> ACCESS RIGHT: BOARD MEMBER G, CONFIDENTIAL <br> JUNE 3, 2006, USER ID: 12345 <br> RETRIEVAL: STRATEGY, COMPETITION INTEGRATION, REGULATION········ <br> PERSON IN CHARGE OF GENERATING DOCUMENT: EXECUTIVE MANAGING DIRECTOR A |
| FF432CE0-AF2E-492C-B6C5-AEEAB4BEFBB8 | 456.789.012.123 ¥h¥image¥zzz | soap | SUSPEND AND NOTIFY admin@fx.co.jp OF ERROR MAIL | FILE NAME: "CLIENT LIST B_image" <br> ACCESS RIGHT: SALES MANAGER, PERSONAL INFORMATION <br> JUNE 4, 2006, USER ID: 10011 RETRIEVAL: MANUFACTURING, FINANCE········ <br> PERSON IN CHARGE OF GENERATING DOCUMENT: SALES MANAGER B |
| EAB4A6C1-AF2E-632C-C6C1-AEEAB4BEFBB8 | ftp://sever.fx.co.jp/dirB | | CHANGE TO ftp://backup.server.fx.co.jp/ dirC | none |
| 36ED2A78-AF2E-4857-C6C9-AEEAB4BEFBB8 | 456.789.012.123 ¥h¥image¥zzz | soap | SUSPEND AND NOTIFY admin@fx.co.jp OF ERROR MAIL | FILE NAME: "TECHNICAL DESCRIPTION C_image" <br> ACCESS RIGHT: EMPLOYEE, TECHNICAL INFORMATION <br> JUNE 5, 2006, USER ID: 02033 <br> RETRIEVAL: Web, XML,········ <br> PERSON IN CHARGE OF GENERATING DOCUMENT: RESEARCHER C |

Fig. 22

| INFORMATION ID (hex) | INPUT METHOD INFORMATION | | | ATTRIBUTE DATA |
|---|---|---|---|---|
| | INPUT DESTINATION ADDRESS | PROTO-COL | ERROR PROCESSING METHOD | |
| C589EFE0-AF2E-432C-A6C1-AEEAB4BEFBB8 | 123.456.789.012 ¥d¥data¥a | http | THREE TIMES RETRIES | FILE NAME: "BUSINESS STRATEGY A_image" <br> ACCESS RIGHT: BOARD MEMBER G, CONFIDENTIAL <br> JUNE 3, 2006, USER ID: 12345 <br> RETRIEVAL: STRATEGY, COMPETITION INTEGRATION, REGULATION......... <br> PERSON IN CHARGE OF GENERATING DOCUMENT: EXECUTIVE MANAGING DIRECTOR A |
| FF432CE0-AF2E-492C-B6C5-AEEAB4BEFBB8 | 456.789.012.123 ¥h¥image¥zzz | soap | SUSPEND AND NOTIFY admin@fx.co.jp OF ERROR MAIL | FILE NAME: "CLIENT LIST B_image" <br> ACCESS RIGHT: SALES MANAGER, PERSONAL INFORMATION <br> JUNE 4, 2006, USER ID: 10011 RETRIEVAL: MANUFACTURING, FINANCE......... <br> PERSON IN CHARGE OF GENERATING DOCUMENT: SALES MANAGER B |
| EAB4A6C1-AF2E-632C-C6C1-AEEAB4BEFBB8 | ftp://sever.fx.co.jp/dirB | | CHANGE TO ftp://backup.server.fx.co.jp/dirC | none |
| 36ED2A78-AF2E-4857-C6C9-AEEAB4BEFBB8 | 456.789.012.123 ¥h¥image¥zzz | soap | SUSPEND AND NOTIFY admin@fx.co.jp OF ERROR MAIL | FILE NAME: "TECHNICAL DESCRIPTION C_image" <br> ACCESS RIGHT: EMPLOYEE, TECHNICAL INFORMATION <br> JUNE 5, 2006, USER ID: 02033 <br> RETRIEVAL: Web, XML,......... <br> PERSON IN CHARGE OF GENERATING DOCUMENT: RESEARCHER C |
| ABCD3A78-AF2E-E78F-ED5A-EDDCB4BEFBB8 | 456.789.456.123.012 kaigi¥siryou | soap | SUSPEND AND PRINT PAPER NOTIFYING USER THAT IT IS SUSPENDED BECAUSE OF ERROR | CONFERENCE ENTITY ID: "857495786" |

Fig. 25

| ICON ID | ICON NAME | INPUT DESTINATION ADDRESS | PROTOCOL | ERROR PROCESSING METHOD |
| --- | --- | --- | --- | --- |
| IID01 | OPERA-TION A | COMPUTER NAME: gyoumuPC1<br>SHARED FOLDER NAME :C:¥Documents and Settings¥mgr-a¥DESK TOP¥ OPERATION A | SMB | ATTACH SCANNED IMAGE FILE, AND TRANSMIT ERROR NOTIFYING MAIL TO Mgr-a@f.jp |
| IID02 | OPERA-TION B | COMPUTER NAME: 456.789.012.123<br>SHARED FOLDER NAME: C:¥Documents and Settings¥mgr-a¥DESK TOP¥ESTIMATE | SMB | ATTACH SCANNED IMAGE FILE, AND TRANSMIT ERROR NOTIFYING MAIL TO Mgr-a@f.jp |
| IID03 | X CORPO-RATION | COMPUTER NAME: gyoumuPC1<br>SHARED FOLDER NAME: C:¥ProgramFiles ¥F¥DocuWorks ¥Contents ¥Scan | SMB | ATTACH SCANNED IMAGE FILE, AND TRANSMIT ERROR NOTIFYING MAIL TO Mgr-a@f.jp |

Fig. 28

Fig. 29

| OPERATION A  PRINT DETAIL SETTING SCREEN | [?] [x] |
|---|---|

DRAFT SIZE: A4

OUTPUT FORM SIZE: SAME SIZE AS DRAFT SIZE

BOTH FACES: NONE

COLOR MODE: COLOR

COMPUTER NAME: gyoumuPC1

SHARED FOLDER NAME: C:¥Documents and Settings¥mgr-a¥DESKTOP¥OPERATION A

PROTOCOL DESIGNATION: SMB

PROCESSING METHOD OF ERROR DURING INPUTTING: ATTACH SCANNED IMAGE FILE, AND TRANSMIT ERROR NOTIFYING MAIL TO  Mgr-a@f.jp

SHARED NAME: OPERATION B

[ OK ]  [ CANCEL ]

Fig. 30

| INFORMATION ID(hex) | INPUT DESTINATION ADDRESS | PROTOCOL | ERROR PROCESSING METHOD |
|---|---|---|---|
| C589EFE0-AF2E-432C-A6C1-AEEAB4BEFBB8 | COMPUTER NAME: gyoumuPC1<br><br>SHARED FOLDER NAME :C:¥Documents and Settings¥mgr-a¥DESK TOP¥ OPERATION A | SMB | ATTACH SCANNED IMAGE FILE, AND TRANSMIT ERROR NOTIFYING MAIL TO Mgr-a@f.jp |
| FF432CE0-AF2E-492C-B6C5-AEEAB4BEFBB8 | COMPUTER NAME: 456.789.012.123<br><br>SHARED FOLDER NAME: C:¥Documents and Settings¥mgr-a¥DESK TOP¥ESTIMATE | SMB | ATTACH SCANNED IMAGE FILE, AND TRANSMIT ERROR NOTIFYING MAIL TO Mgr-a@f.jp |
| EAB4A6C1-AF2E-632C-C6C1-AEEAB4BEFBB8 | COMPUTER NAME: gyoumuPC1<br><br>SHARED FOLDER NAME: C:¥ProgramFiles ¥F¥DocuWorks ¥Contents ¥Scan | SMB | ATTACH SCANNED IMAGE FILE, AND TRANSMIT ERROR NOTIFYING MAIL TO Mgr-a@f.jp |

Fig. 31

| PRINT DOCUMENT INFORMATION | | INPUT METHOD INFORMATION | | | | ATTRIBUTE INFORMATION | | |
|---|---|---|---|---|---|---|---|---|
| FILE NAME | FOLDER NAME | COMPUTER NAME | PROTOCOL | FOLDER NAME | SHARED NAME | FILE NAME | RETRIEVAL INDEX | IMPLANT DATA |
| A CORPORATION CHECK | C:\CHECK\form | center1 | SMB | C:\CHECK\kanto | kanto | A CORPORATION CHECK S | http://kokyaku.db.f.jp/A | 20070303 |
| B CORPORATION CHECK | C:\CHECK\form | center1 | SMB | C:\CHECK\kanto | kanto | B CORPORATION CHECK S | http://kokyaku.db.f.jp/B | 20070303 |
| C CORPORATION CHECK | C:\CHECK\form | center1 | SMB | C:\CHECK\kanto | kanto | C CORPORATION CHECK S | http://kokyaku.db.f.jp/C | 20070303 |
| D CORPORATION CHECK | C:\CHECK\form | center1 | SMB | C:\CHECK\kanto | kanto | D CORPORATION CHECK S | http://kokyaku.db.f.jp/D | 20070303 |
| E CORPORATION CHECK | C:\CHECK\form | center2 | SMB | C:\CHECK\kansai | kansai | E CORPORATION CHECK S | http://kokyaku.db.f.jp/E | 20070303 |
| F CORPORATION CHECK | C:\CHECK\form | center2 | SMB | C:\CHECK\kansai | kansai | F CORPORATION CHECK S | http://kokyaku.db.f.jp/F | 20070303 |

Fig. 34

SYSTEM AND METHOD FOR INCLUDING INPUT METHOD INFORMATION ON A PRINTED DOCUMENT

CROSS-REFERENCE TO RELATED APPLICATIONS

This application is based on and claims priority under 35 USC 119 from Japanese Patent Application No. 2006-315428 filed on Nov. 22, 2006 and Japanese Patent Application No. 2007-189230 filed on Jul. 20, 2007.

BACKGROUND

1. Technical Field

The present invention relates to a print medium processing system, a printing apparatus, an information processing apparatus, and a recording medium.

2. Related Art

Currently, a variety of operations such as a delivery service and a questionnaire aggregating and processing are executed by using forms. For example, in the questionnaire aggregating operation, a questionnaire form in a prescribed format is delivered to a user to be collected, and items inscribed to the collected questionnaire form are aggregated. In this case, a computer system is used to process a huge amount of questionnaire forms. The computer system scans the questionnaire forms and recognizes line drawings written on a paper to collect data, i.e. questionnaire results, and aggregates and processes the collected data.

SUMMARY

According to an aspect of the present invention, there is provided a print medium processing system including: an identification information generating unit that receives input method information which is referred to when image data is inputted to an application which processes the image data, and generates identification information for the received input method information; an information memory that stores the generated identification information in a manner associated with the input method information; a printing unit that adds the identification information of the input method information to image data to be printed, and prints the image data; a reading unit that reads image data printed in a print medium by the printing unit; an extracting unit that extracts the identification information from the image data read by the reading unit; an obtaining unit that obtains the input method information specified by the identification information extracted by the extracting unit from the information memory; and a transferring unit that transfers the image data read by the reading unit to an application specified from the input method information obtained by the obtaining unit.

BRIEF DESCRIPTION OF THE DRAWINGS

Exemplary embodiments of the present invention will be described in detail based on the following figures, wherein:

FIG. 7 is a diagram illustrating an example of the slip printed by a slip printing processing of the exemplary embodiment 1;

FIG. 8 is a diagram illustrating an example of the slip when a receipt stamp is stamped on the slip illustrated in FIG. 7;

FIG. 10 is a diagram illustrating an example of an answer form with a questionnaire, which is processed in the exemplary embodiment 1;

FIG. 20 is a diagram illustrating an example of an estimation sheet printed by the image forming apparatus of the exemplary embodiment 5;

FIG. 22 is a diagram illustrating a data configuration and a data setting example of information which is set and registered in the information memory of the exemplary embodiment 6;

FIG. 25 is a diagram illustrating a data configuration and a data setting example of other information which is set and registered in the information memory of the exemplary embodiment 6;

FIG. 28 is a diagram illustrating a data configuration of definition information of input method information which is set and registered in a definition information memory of the exemplary embodiment 7;

FIG. 29 is a diagram illustrating a display example of a printer icon which is previously provided to set the input method information in the exemplary embodiment 7;

FIG. 30 is a diagram illustrating a display example of a print detail screen of the exemplary embodiment 7;

FIG. 31 is a diagram illustrating a data configuration and a data setting example of information which is set and registered in the information memory of the exemplary embodiment 7;

FIG. 34 is a diagram illustrating a data configuration example of the input method information which is managed in a spread sheet in an exemplary embodiment 10.

DETAILED DESCRIPTION

Exemplary embodiments of the present invention will be described below based on the drawings.

Exemplary Embodiment 1

Figure 1:
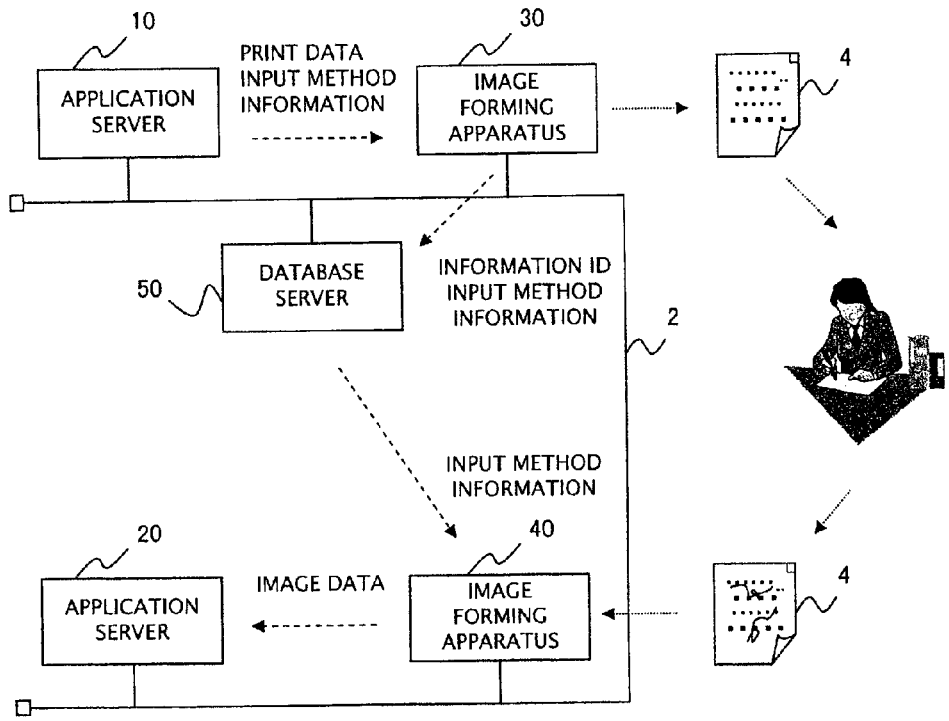
FIG. 1 is an entire configuration diagram illustrating an exemplary embodiment 1 of a print medium processing system according to the present invention.

FIG. 1 is an entire configuration diagram illustrating an exemplary embodiment of a print medium processing system according to the present invention. FIG. 1 illustrates a configuration in which a network 2 connects application servers 10 and 20, image forming apparatus 30 and 40, and a database server 50. The application server 10 is a server computer which mounts an application generating image data (hereinafter, also referred to as [print data]) to be printed, and instructs the image forming apparatus 30 to print by transmitting the print data and an input method information. The image forming apparatus 30 is an image forming apparatus including at least a printing function, and prints the transmitted print data. When the new input method information is transferred from the application server 10, the image forming apparatus 30 of the present exemplary embodiment generates information ID for identifying the input method information, and adds the information ID to the print data to print. The database server 50 associates the input method information transferred from the image forming apparatus 30 with the information ID provided to the input method information, and maintains and manages the associated information. The image forming apparatus 40 is an image forming apparatus including at least a reading function. A user writes something to a print form 4 generated by the image forming apparatus 30, and the image forming apparatus 40 scans the written print form 4 to generate image data. The image forming apparatus 40 of the present exemplary embodiment obtains the input method information corresponding to the information ID from a database server 50 by referring to the information ID included in the read image data (hereinafter, also referred to as [read image data]), and transmits the read image data to the application server 20 specified from the input method information. The application server 20 is a server computer which has installed an application executing prescribed processing for the inputted image data.

FIG. 1 conveniently illustrates each one of the application servers 10 instructing the printing, the image forming apparatus 30 executing the printing, the image forming apparatus 30 reading the print form, and the application server 20 processing the image data respectively. However, the print medium processing system may be configured so that plural units are connected to the network 2. While FIG. 1 illustrates that the network 2 is formed by a LAN, it may be constructed by a WAN. Thus, the database server 50 which is shared by the image forming apparatus 30 and 40 may be allocated on the Internet.

Figure 2:
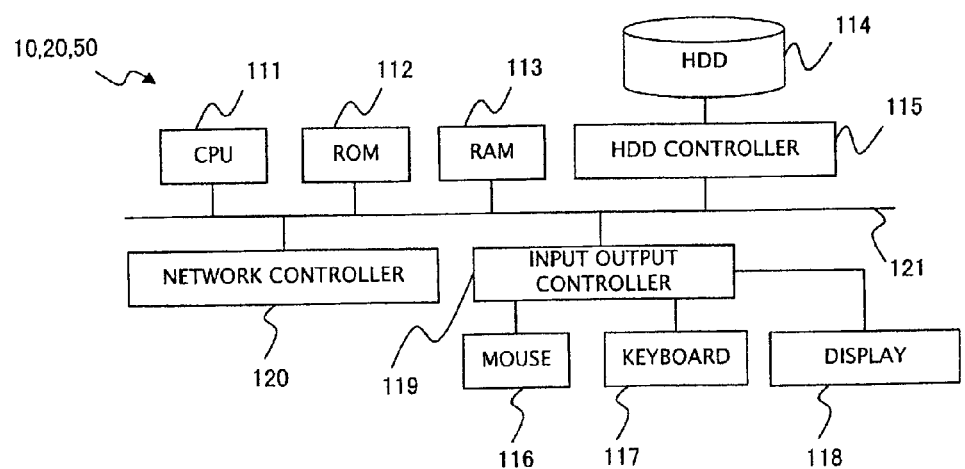
FIG. 2 is a hardware configuration diagram of an application server of the exemplary embodiment 1.

FIG. 2 is a hardware configuration diagram of the application server 10 of the present exemplary embodiment. The application server 10 used in the present exemplary embodiment may be realized by a hardware configuration of a general server computer which currently exists. That is, as illustrated in FIG. 2, the application server 10 is configured by connecting an internal bus 121 to a CPU 111, a ROM 112, a RAM 113, an HDD controller 115 connecting a hard disk drive (HDD) 114, an input output controller 119 connecting a mouse 116 and a key board 117 which are provided as input units, a display 118 which is provided as a display apparatus, and a network controller 120 which is provided as a communicating unit.

While there may be differences in performance, the application server 20 is also the same server computer, so that the basic hardware configuration of the application server 20 may be illustrated as in FIG. 2. Of course, when an application is executed, if hardware which is not illustrated becomes necessary, the hardware needs to be mounted. The database server 50 may be illustrated as in FIG. 2 since it is also the same server computer.

Figures 3, 5:
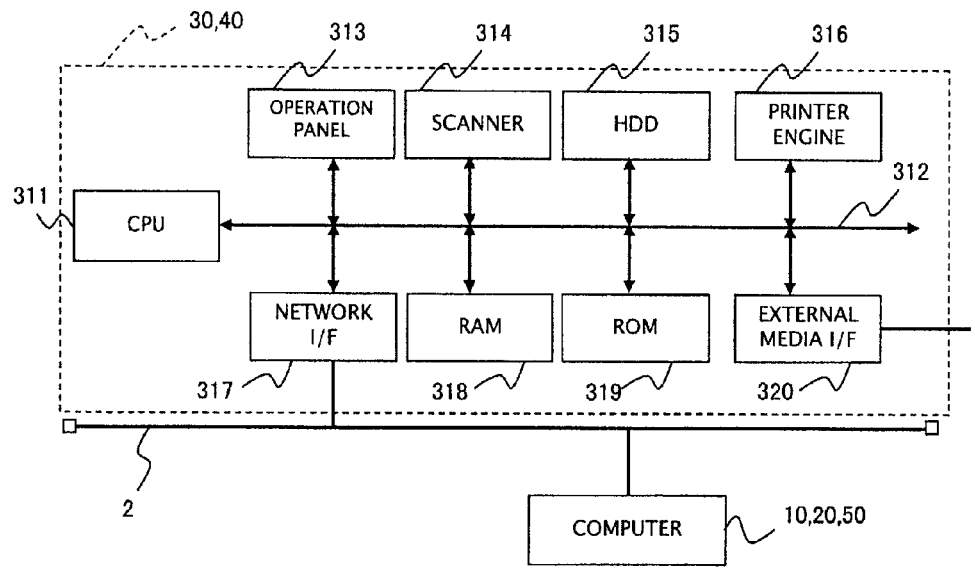
FIG. 3 is a hardware configuration diagram of an image forming apparatus of the exemplary embodiment 1.
FIG. 5 is a diagram illustrating a data configuration and a data setting example of information which is set and registered in an information memory of the exemplary embodiment 1.

FIG. 3 is a hardware configuration diagram of the image forming apparatus 30 of the present exemplary embodiment. The image forming apparatus 30 includes at least a printing function as described above, and is an apparatus which incorporates a computer. In FIG. 3, a CPU 311 controls operation of a variety of units mounted on the present apparatus, such as a scanner 314 and a printer engine 316, depending on programs stored in a ROM 319. An address data bus 312 connects to a variety of units to be controlled by the CPU 311 to communicate data. An operation panel 313 receives an instruction from a user to display information. The scanner 314 reads a draft set by a user to accumulate as electronic data in an HDD (Hard Disk Drive) 315, etc. The HDD 315 stores image data, etc. read by the scanner 314. The printer engine 316 prints an image on an output form depending on an instruction from a control program executed by the CPU 311. A network interface (I/F) 317 connects the network 2 to be utilized to receive the print data transferred to the present apparatus, and transmit the input method information and the information ID. A random access memory (RAM) 318 is utilized as a work memory when a program is executed, and as a buffer when the print data is transmitted and received. In the present exemplary embodiment, the print data and the input method information are memorized. The read only memory (ROM) 319 stores a variety of programs relating to the control for the present apparatus, cryptography of electronic data, and the transmitting and receiving on electronic data. A variety of processing functions are realized by executing the variety of programs. An external media interface (I/F) 320 is an interface with an external memory unit such as a USB memory and a flash memory.

While there may be differences in performance, a basic hardware configuration of the image forming apparatus 40 may be illustrated as in FIG. 3.

Figure 4:
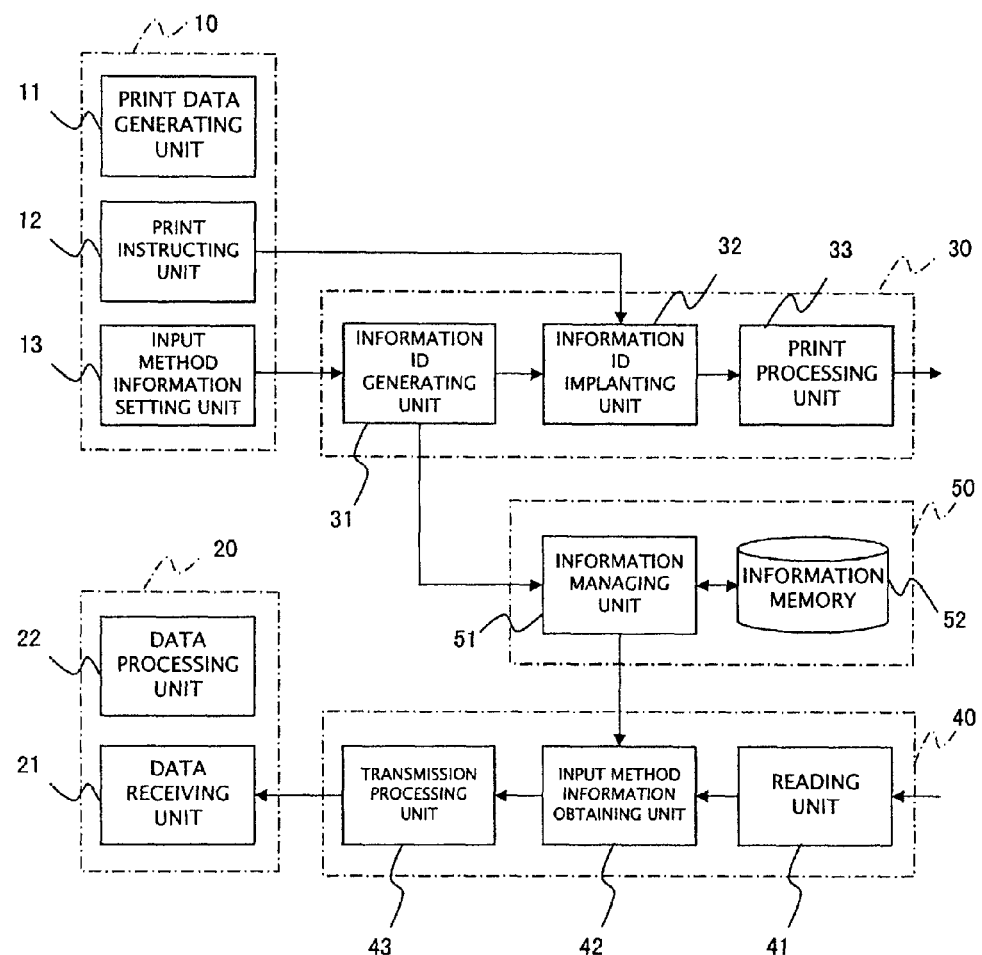
FIG. 4 is a block configuration diagram illustrating the print medium processing system of the exemplary embodiment 1.

FIG. 4 is a block configuration diagram illustrating the print medium processing system of the present exemplary embodiment. The application server 10 includes a print data generating unit 11, a print instructing unit 12, and an input method information setting unit 13. The print data generating unit 11 generates image data to be printed, and the print instructing unit 12 transmits the generated print data to instruct the image forming apparatus 30 to print. The print data generating unit 11 and the print instructing unit 12 are realized by some of the processing functions included by applications incorporated in the application server 10. The input method information setting unit 13 sets the input method information which is used to specify an application which inputs and processes the read image data of the print form, which is generated by printing the print data, and transmits to the image forming apparatus 30.

The image forming apparatus 30 includes an information ID generating unit 31, an information ID implanting unit 32, and a print processing unit 33. The information ID generating unit 31 receives the input method information transferred from the application server 10, generates the identification information (information ID) for the input method information, and also transmits the generated information ID and the corresponding input method information to the database server 50 to cause the database server 50 to register the transmitting information. The information ID implanting unit 32 encodes the information ID and implants the encoded information ID in the print data transferred from the application server 10. The print processing unit 33 is a unit which realizes a printing function included by the image forming apparatus 30, and prints the print data. The information ID implanting unit 32 of the present exemplary embodiment encodes the information ID to the QR code, so that the QR code is printed at a prescribed location of the print form.

The database server 50 includes an information managing unit 51 and an information memory 52. The information memory 52 stores the information ID and the input method information, and the information managing unit 51 causes the information ID and the input method information, which are transferred from the image forming apparatus 30, to correspond to each other and registers the corresponding information in the information memory 52. The information managing unit 51 notifies the corresponding input method information depending on an information obtaining request.

The image forming apparatus 40 includes a reading unit 41, an input method information obtaining unit 42, and a transmission processing unit 43. The reading unit 41 is a unit which realizes a scanning function included by the image forming apparatus 40, and scans the print form to generate image data. When the reading unit 41 scans the print form generated by the image forming apparatus 30, as the QR code data is included in the read image data, the input method information obtaining unit 42 detects the QR code from the read image data, and transmits an information obtaining request including the information ID indicated by the detected QR code to the database server 50 to obtain the input method information corresponding to the information ID. The transmission processing unit 43 transmits the read image data to a transmission destination of the read image data, which can be specified from the obtained input method information.

The application server 20 includes a data receiving unit 21 and a data processing unit 22. The data receiving unit 21 receives the image data transmitted from an external apparatus, such as the read image data transferred from the image forming apparatus 40. The data processing unit 22 executes prescribed processing by using the received image data. The data processing unit 22 is generally realized by some of the processing functions included by the applications incorporated in the application server 20.

The information memory 52 which is described above is realized with the HDD 114 which is a memory. Each of the other components is realized by cooperation between each of the mounted computers 10, 20, and 50 or the image forming apparatus 30 and 40, and a program operating on the CPU 111 contained in each of the computers 10, 20, and 50, or the computer CPU 311 contained each of the image forming apparatus 30 and 40. Programs used in the present exemplary embodiment can be provided by a communication unit, and also by storing in a recording medium such as CD-ROM.

FIG. 5 is a diagram illustrating a data configuration and a data setting example of information which is set and registered in the information memory 52 of the present exemplary embodiment. The information managing unit 51 newly registers information in the information memory 52 configured as follows, and the registered information is transferred from the image forming apparatus 30 every time the information ID is assigned to the input method information.

As illustrated in FIG. 5, the input method information is registered in correspondence with the information ID in the information memory 52, which includes an input destination address, a protocol, and an error processing method. The information ID is information which is used to identify the input method information as described above. There is a method using a UUID (Universally Unique IDentifier), whose number of bits is 128, determined based on the time and MAC address of a computer executing programs in order to cause the information ID to be unique at a global level. There is a method using a manufacturing number of a computer instead of the MAC address in order to cause the information ID to be unique in a computer system of a specific company. There is a method, etc. adopting an unused number from a management table in order to cause the information ID to be unique in one computer. The information ID can be generated depending on the above levels at which the information ID is caused to be unique.

The input method information is information designating a method which inputs the read image data of the image forming apparatus 40 to an application, and is information designated by the application server 10 which runs an application generating the print data which is a source of the read image data. In an item, the input destination address is included in the input method information, and information is designated which can specify an application inputting the read image data such as, for example, an IP address and an input destination directory name. In an item, the protocol is included in the input method information, and a protocol or a command is designated which is used when the image data is delivered to the corresponding application, such as, for example, FTP, HTTP, WebDAV, and SOAP. In an item, one or more actual processing methods are designated as the error processing method, such as, for example, an item relating to notification such as a notifying destination and a notifying unit (e-mail, print, etc.) when an error is induced, an item relating to error log such as existence or nonexistence of a log record, a recording destination, the number of retries, suspending input, erasing image m hours after suspending input, and an alternative destination when an error is induced.

Next, operations of the present exemplary embodiment will be described. Here, an example will be described where delivery management is executed by using a slip in which a delivery slip and a receipt are combined, and first, processing until the slip is printed will be described by using a flowchart illustrated in FIG. 6.

First, in the application server 10 which prints a slip, the print data generating unit 11 configuring a part of a prescribed application writes necessary items such as a delivery destination in a slip whose form is predetermined, and generates slip data as the print data (step 101), and the print instructing unit 12 transmits the slip data to be printed to the image forming apparatus 30. Meanwhile, the image forming apparatus 30 which is a print request destination may be previously set by the application server 10, or be caused to designated by a slip creator. The slip creator subsequently designates item data which is necessary to generate the input method information. The slip data is printed by the image forming apparatus 30, and the slip is formed, but the item data which is necessary to generate the input method information is data which can specify an application inputting the read image data of the written slip. Actually, as described using FIG. 5, in the present exemplary embodiment, the item data is a variety of item information, such as the input destination address, the protocol, and the error processing method. Meanwhile, a method which designates the item data is normally assumed to input the item data on a prescribed setting screen by utilizing a user interface of the application server 10, but another method may be utilized which uses a file or a parameter. Another user who is not the slip creator but an administrator may input the item data. When receiving the item data inputted by a user, the input method information setting unit 13 generates the input method information including the item data (step 102). Next, the input method information setting unit 13 transmits the generated input method information to the image forming apparatus 30.

Meanwhile, the application server 10 transmits the print data and the input method information corresponding to the print data to the image forming apparatus 30 which is requested to print, so it is necessary to clarify the corresponding relation between the print data and the input method information. In the present exemplary embodiment, the print data generating unit 11 and the print instructing unit 12 transmit the print data and the input method information respectively with different processing. However, the corresponding relation may be clarified by combining and transmitting the print data and the corresponding input method information. If each data is separately transmitted as in the present exemplary embodiment, it is desirable to be able to easily associate the print data with the input method information by causing the input method information to include the identification information of the print data.

In the image forming apparatus 30, when receiving the input method information transferred from the application sever 10, the information ID generating unit 31 generates the information ID which is used to identify the input method information (step 103). When receiving both of the print data and the information ID of the input method information corresponding to the print data from the application server 10, the information ID implanting unit 32 first encodes the information ID to the image data of the QR code, and overlaps the image data of the QR code to the corresponding print data to combine these two items of data (step 104). The print data to which the QR code is implanted in the image combination is, for example, a PDL (Print Description Language) file, PDF (Portable Document Format)/PS (Post Script) file, or an image data file of TIFF (Tagged Image File Format)/JPEG (Joint Photographic Experts Group) format. Bar code, PDF417, Code49, QR code, Data Matrix, etc. can be used as an encoding method of the information ID. In the present exemplary embodiment, the QR code is used as described above. The print processing unit 33 prints the print data generated by the information ID implanting unit 32 to generate a slip (step 105).

Figure 7:
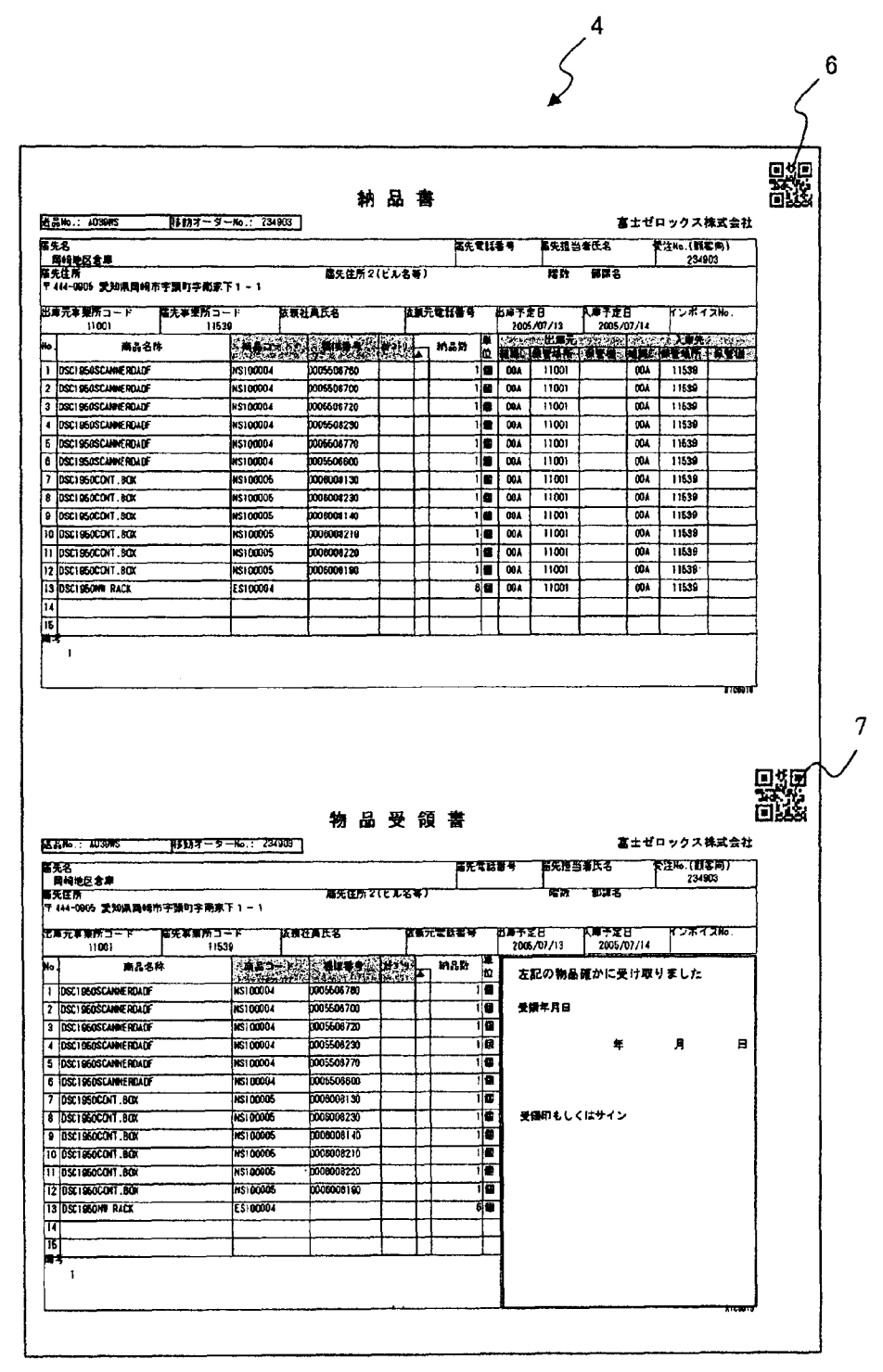

FIG. 7 is a diagram illustrating an example of a slip printed by the above processing. The information ID implanting unit 32 of the present exemplary embodiment implants the QR code in the slip data so that the QR code is printed at a location on a form where the slip is not printed, actually an upper right area of the form, so that as exemplified in FIG. 7, a QR code 6 indicating the information ID is printed at an upper right area of a print form 4 of the slip.

The location on a form, where the slip data is not printed, can be specified by analyzing the slip data. In an example illustrated in FIG. 7, in the print data from a slip application of a transportation business, a slip number used by the application is encoded to a QR code 7 to be included at a central right side. However, the present exemplary embodiment does not relate to the encoding and decoding of a slip number used by the slip application.

Figure 8:
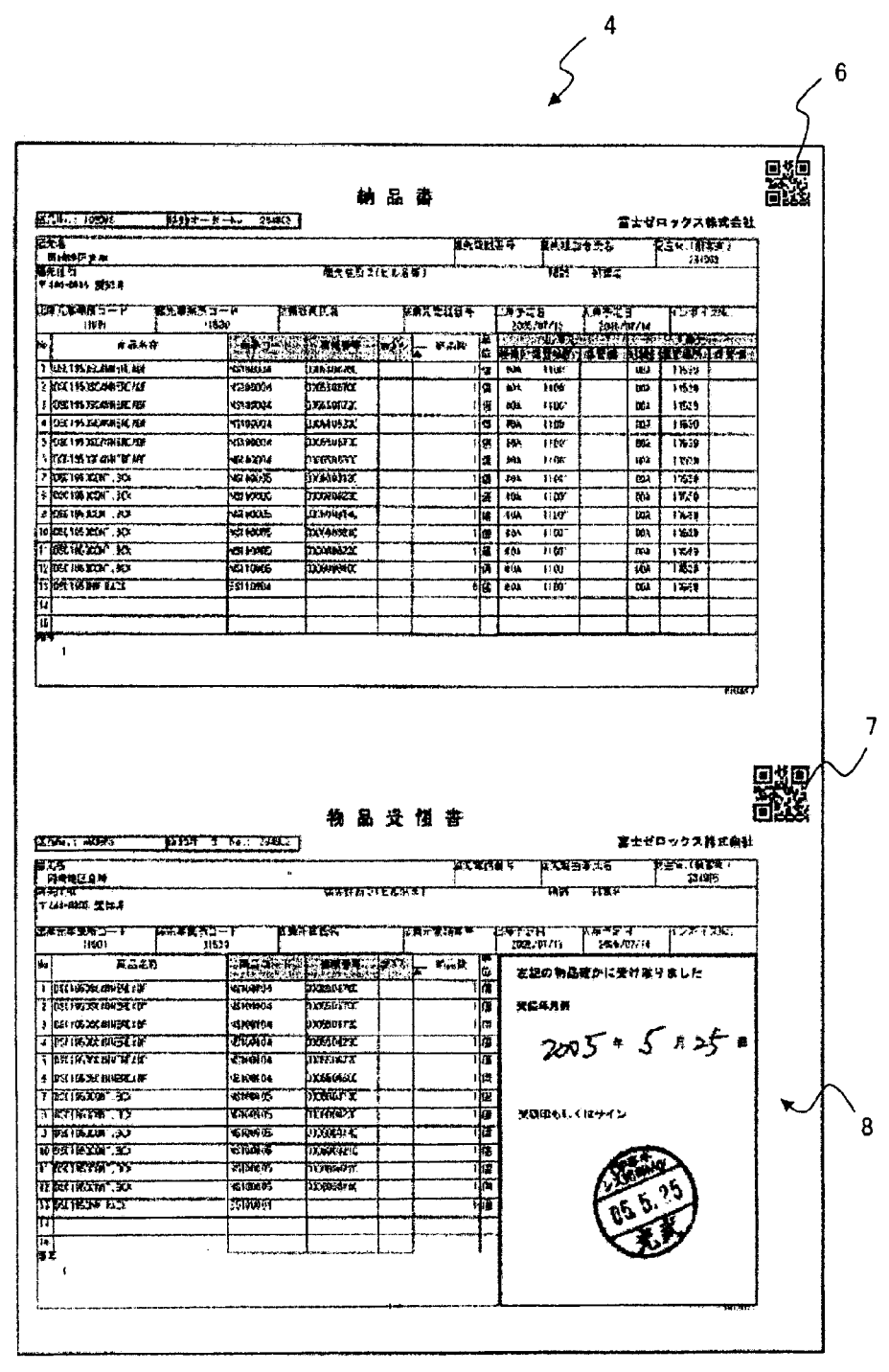
Figure 9:
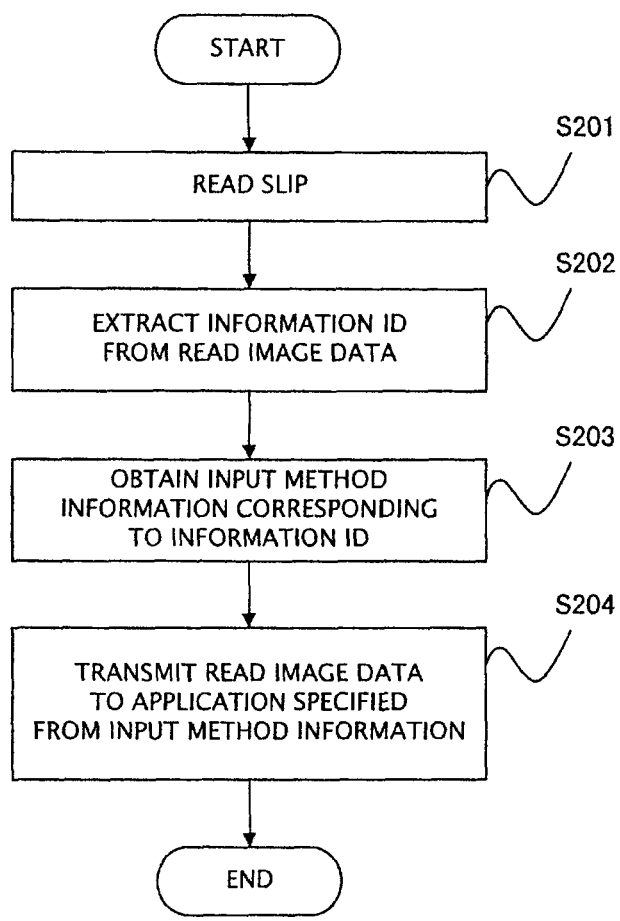
FIG. 9 is a flowchart illustrating processing until a designated application inputs read image data of the slip in the exemplary embodiment 1.

After a person in charge of delivery of in a transportation business carries the slip illustrated in FIG. 7 to deliver goods, the person receives a receipt stamp from a consignee and carries the slip back. An example of the slip in which a receipt stamp 8 is added is illustrated in FIG. 8. Processing which is executed until a designated application inputs the image data obtained by reading the slip will be described by using a flowchart illustrated in FIG. 9.

In the image forming apparatus 40, the reading unit 41 reads the slip, to which a receipt stamp 8 is added, with the scanner 314 (step 201). When receiving the image data read by the reading unit 41, the input method information obtaining unit 42 detects the QR code by using implanting location/direction detection, distortion correction, and an error correction code of the QR code included in the image data, and decodes to extract the information ID (step 202). The input method information obtaining unit 42 subsequently transfers an input method information obtaining request including the extracted information ID to the database server 50.

In the database server 50, the information managing unit 51 reads the input method information corresponding to the information ID included in the transferred obtaining request from the information memory 52 to reply to the image forming apparatus 40 which is a request transmitting source.

As a result, the input method information obtaining unit 42 of the image forming apparatus 40 obtains the input method information from the database server 50 (step 203) to transfer the obtained input method information and the image data to the transmission processing unit 43.

The transmission processing unit 43 transmits the transferred image data according to the specified protocol to the application server 20 which is specified by referring to a setting content of the input method information transferred together with the image data (step 204). If an error is induced during the transmission, error processing is executed according to the error processing method included in the input method information.

As described above, when the data receiving unit 21 of the application server 20 receives the image data transferred from the image forming apparatus 40, the data processing unit 22 inputs the image data to execute a prescribed processing. Meanwhile, in this case, the data processing unit 22 is incorporated in an application which handles a slip, and the application encodes the QR code at a central right side of the inputted image data to obtain a slip number, and confirms that the receipt stamp, etc. is added in the [receipt stamp or signature] field. Moreover, the data processing unit 22 updates a state of a delivery job corresponding to the slip number of the delivery management system to 'delivered' and store the image data in a folder corresponding to the slip number.

According to the present exemplary embodiment, as described above, the information ID is assigned to the input method information which is set in correspondence with the print data, and the encoded information ID is printed on the print form together with the slip data. As a result, the application which inputs and processes the slip data can be specified from the information ID included in the read image data of the slip, so that even if a user causing the slip to be read does not know an application processing the slip or an operating destination of the application, the slip can be automatically assigned to the application and is securely inputted. That is, an application inputting the image data and an inputting method inputting the image data to the application are managed by the delivery management system of the present exemplary embodiment, so that a user handling the slip does not need to be aware of the application at all. Furthermore, an apparatus reading the slip (the image forming apparatus 40) can specify an application to which the read slip data is transferred by inquiring of the database server 50 based on the information ID implanted in the slip, so that if the apparatus reading the slip includes a processing function included by the image forming apparatus 40, the user does not need to select an apparatus which is used to read the slip from the apparatus.

Meanwhile, in the present exemplary embodiment, the QR code 6 indicating the information ID is added to the existing slip to be printed. Thus, two or more QR codes are printed. Therefore, one QR code may be generated and printed as coupling data expressed by the QR code 7 and the information ID.

FIG. 10 is a diagram illustrating an example of an answer form (hereinafter, referred to as just [questionnaire form]) with a questionnaire, which is processed by the present exemplary embodiment. In the above description, the print form to be read is a slip, and an example is described in which the present invention is applied to the delivery management system. Here, a case will be exemplified as an applied example in which the present invention is applied to the questionnaire aggregating and processing system.

Here, a case will be described where a questionnaire is treated as the print data, but the processing flow is the same as that of the slip case, so that the description will be omitted. However, in the above example, a slip whose content is not basically the same is printed, and is identified by the QR code 7, while in the case exemplified here, on the other hand, the questionnaire form is printed, the content of which is basically the same. That is the point of difference.

Figure 11:
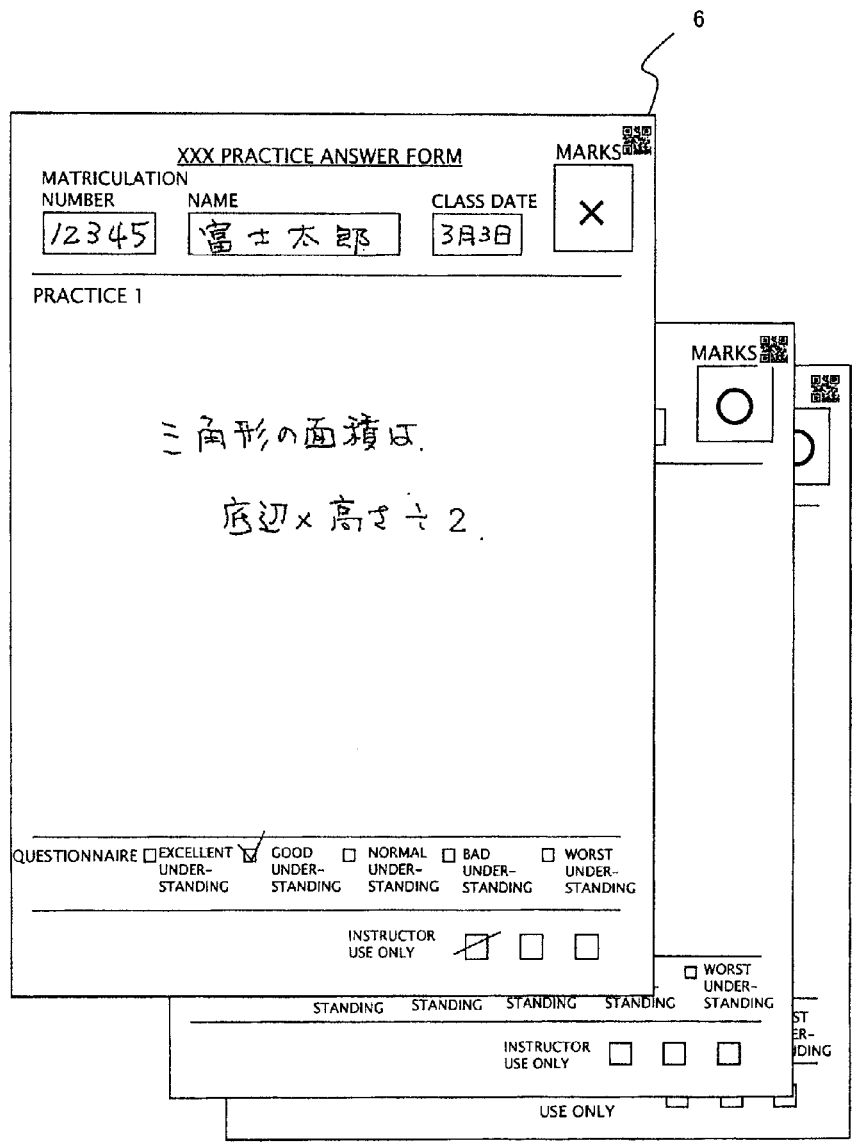
FIG. 11 is a diagram illustrating an example of a form when answers for the examination and the questionnaire are described in the answer form with a questionnaire, which is illustrated in FIG. 10.

As exemplified in FIG. 11, in the questionnaire form, answers for questionnaire items are written together with answers for the examination, and the read image data of each form is inputted to an aggregation application specified based on the QR code of the read image data as described above. Meanwhile, an application which aggregates answer forms for the examination in a school carries out processing as follows. That is, when answer forms written by students in a school are scanned as they are being stacked (continuously), the image data obtained by the scanning is sequentially inputted to the aggregation application. The aggregation application character-recognizes each area image of matriculation number, name, and class date by using an OCR (Optical Code Reader) to convert to digital data, recognizes a check area of a questionnaire field to convert to digital data, and generates each of the digital data as data for a spread sheet application. Also in the present exemplary embodiment, the aggregation application executing such processing is assumed.

As described above, in the present exemplary embodiment, a case is exemplified where the present invention is applied to each system executing delivery slip management and questionnaire aggregation management, and the present invention can also be applied to a variety of systems such as document management, business negotiation management, and television conferencing.

When a slip, which the same one does not basically exist, is processed, the read image data of the slip is inputted to an application and the slip processing is terminated, so that the corresponding input method information and information ID basically become unnecessary. Thus, when the information managing unit 51 receives a request for obtaining the corresponding input method information and then normally replies, and preferably, when the application server 20 can confirm that the slip processing is normally terminated, it is desirable to delete the input method information and the information ID, which correspond to the slip, from the information memory 52. On the other hand, when an answer form and a questionnaire form, which the same form exists, are processed, it is need that the same input method information will be repeatedly read, so that the input method information can not be deleted from the information memory 52 immediately after replying by the information managing unit 51. Thus, in such a case, for example, the information managing unit 51 deletes the corresponding information according to a deleting instruction from a user who confirms that it has been terminated, and the questionnaires are collected.

By the way, in the above description, a case is exemplified in which one item of read image data is inputted to one application, but a case may also be considered where one item of read image data is inputted to plural applications. For example, in a slip, etc., the kind and number of applications depend on the business content, such as an application which processes character data obtained by processing data written in a prescribed location with an OCR apparatus, an application which stores image data of each of a stamp and a signature on a slip, and an application which notifies an administrator that a specific slip has been scanned.

Figures 12, 13:
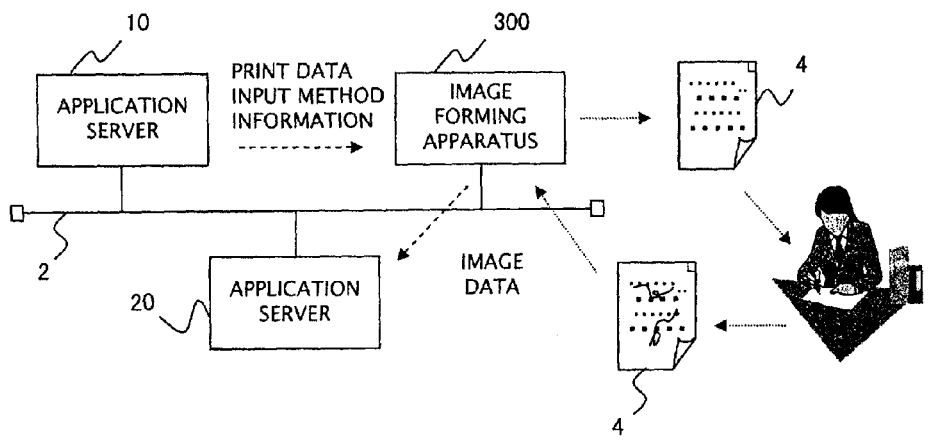
FIG. 12 is a diagram illustrating another data configuration example of information which is set and registered in the information memory of the exemplary embodiment 1.
FIG. 13 is an entire configuration diagram illustrating the print medium processing system of an exemplary embodiment 2.

FIG. 12 is a diagram illustrating a data configuration of information which is set and registered in the information memory 52 of the present exemplary embodiment. As it is apparent as compared with FIG. 5, here, one information ID corresponds to the plural input method information. As described above, by associating the information ID with the input method information, in the image forming apparatus 40 reading the print form, the plural input method information can be obtained for the information ID obtained from the read image data, so that, one read image data can be inputted to plural application.

The present exemplary embodiment is configured so that the information managing unit 51 is provided in the database server 50, and the input method information registered in the information memory 52 can be changed, which is convenient in the following case. For example, when a location where a slip printed in the past is stored is changed from a server of A department to a server of B department because an organization is changed, the input destination address corresponding to the information ID printed in a slip which has been generated, but is not yet read, is changed to an address of an application mounted in the server of the B department, so that subsequently, the read image data can be stored in the server of the B department. After the read image data is transferred to an application which scans and aggregates answer forms for the examination in a school to be processed, when it is desirable to select excellent answer forms from the aggregated answer forms, and store in a public server, the input destination address corresponding to the information ID printed in the answer forms is changed from the aggregating application to the public server. Thus, if the aggregated answer forms for the examination are scanned again, at this time, the read image data can be stored in the public server.

As described above, according to the present exemplary embodiment, even when it is desirable to input information to a desired application, which a user adds to the print form generated according to an instruction from an application, it becomes unnecessary to cause a user to designate an application, which is an input destination, in each case. As a result, it is not necessary for the user to previously know an application inputting the read image data, and it is not necessary to cause the user to designate an application, so that such a problem is not caused where the read image data is delivered by mistake. In the present exemplary embodiment, the identification information such as a form ID, an information ID, and a processing ID which are conventionally provided is not necessary. In the present exemplary embodiment, the identification information is provided to the input method information of an image to an application. That is, the processing is not defined, and is executed after the image data is inputted to an application, so that it is easy to automatically select exceptional processing which is different from original processing, and to change processing for the image data.

Exemplary Embodiment 2

Figure 14:
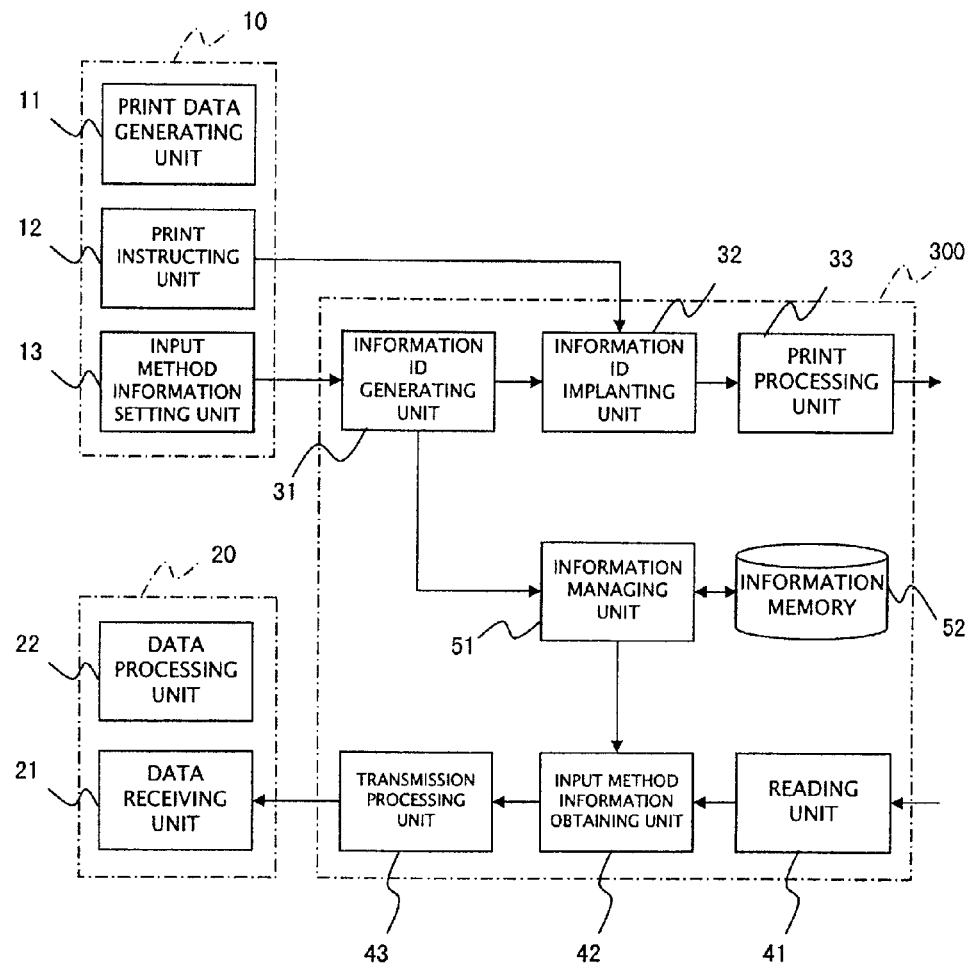
FIG. 14 is a block configuration diagram illustrating the print medium processing system of the exemplary embodiment 2.

In the present exemplary embodiments and the following exemplary embodiment, modified examples of a system configuration will be described. FIG. 13 is an entire configuration diagram of a print medium processing system of the present exemplary embodiment, and FIG. 14 is a block configuration diagram illustrating the print medium processing system of the present exemplary embodiment. Meanwhile, in each diagram, the same code is attached to the same component as that of the exemplary embodiment 1, and the description will be omitted. While a system configuration and an allocation of function blocks of the present exemplary embodiment are different from that of the exemplary embodiment 1, a system operation itself of the present exemplary embodiment is the same as that of the exemplary embodiment 1, so that the description of the operation will be also omitted. That is also the same in the following exemplary embodiments.

In the above exemplary embodiment 1, while a system is constructed by assigning each processing such as printing, data storing, reading, and data transmitting to plural apparatus, in the present exemplary embodiment, the processing is concentrated in one image forming apparatus 300. That is, as described above, the image forming apparatus incorporates a computer, and includes a printing function, a storing function, a reading function, and a communicating function, so that the above processing functions can be realized with one image forming apparatus 300.

Exemplary Embodiment 3

Figure 15:
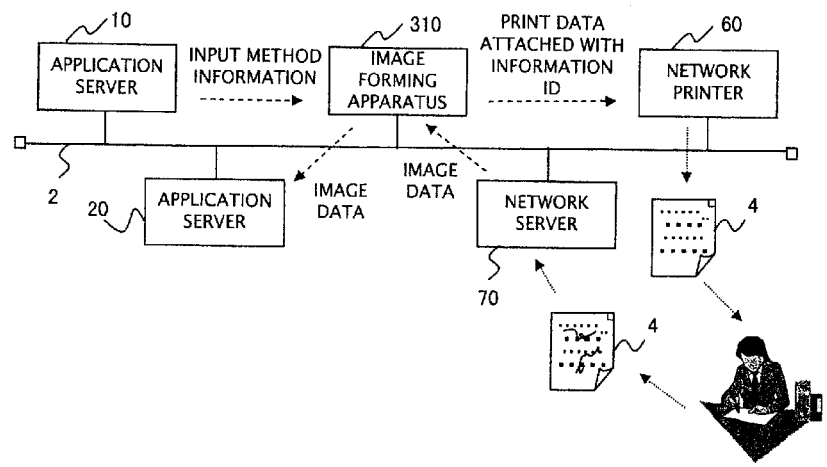
FIG. 15 is an entire configuration diagram illustrating the print medium processing system of an exemplary embodiment 3.
Figure 16:
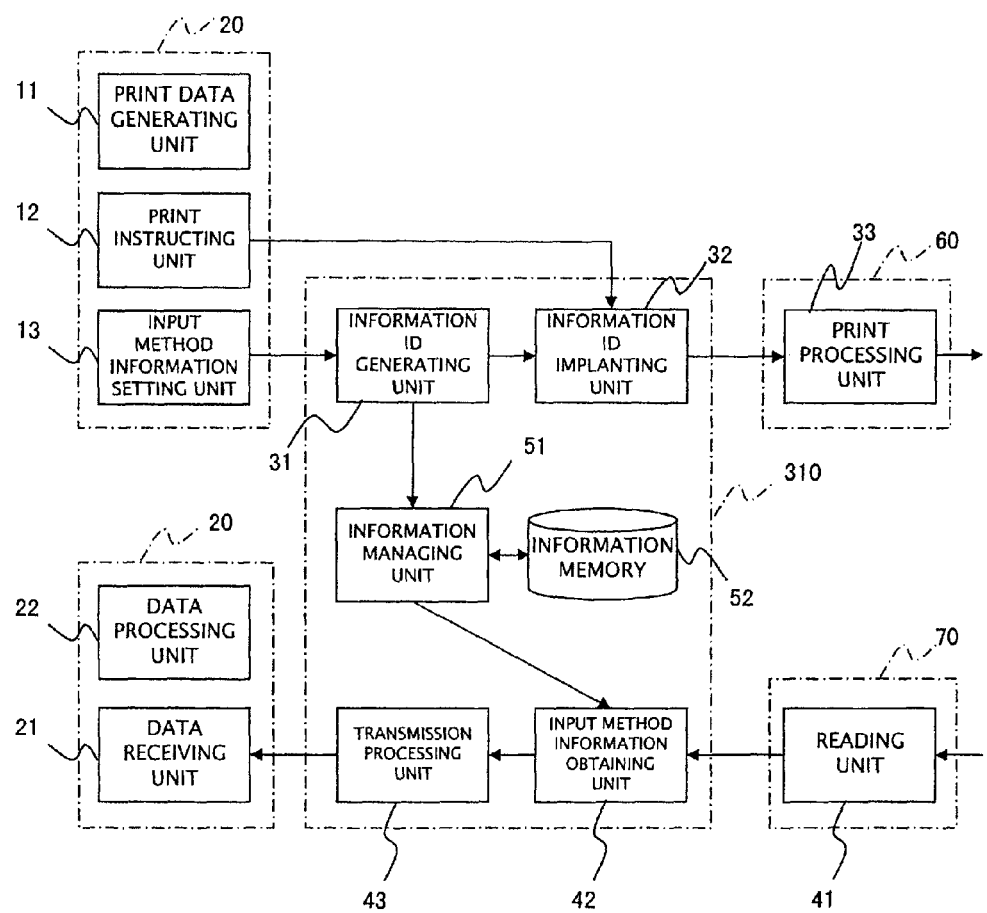
FIG. 16 is a block configuration diagram illustrating the print medium processing system of the exemplary embodiment 3.

FIG. 15 is an entire configuration diagram of a print medium processing system of the present exemplary embodiment, and FIG. 16 is a block configuration diagram illustrating the print medium processing system of the present exemplary embodiment. In the above exemplary embodiment 2, components executing each processing are integrated in an image forming apparatus. In the present exemplary embodiment, the printing function and the reading function are realized by another apparatus outside the image forming apparatus 310. That is, as illustrated in FIG. 15, in the present exemplary embodiment, a network printer 60 and a network scanner 70 are connected to the network 2. As illustrated in FIG. 16, the network printer 60 includes the print processing unit 33, and receives the print data, to which the QR code of the information ID is added, from the image forming apparatus 310 to print to a form. The network scanner 70 includes the reading unit 41, and reads a form to which a user writes prescribed items to transfer the image data generated by the reading operation to the image forming apparatus 310.

By configuring as in the present exemplary embodiment, the network printer 60 and the network scanner 70 do not need any new additional function, so that an existing network printer 60 and network scanner 70 can be directly utilized as they are.

Exemplary Embodiment 4

Figure 17:
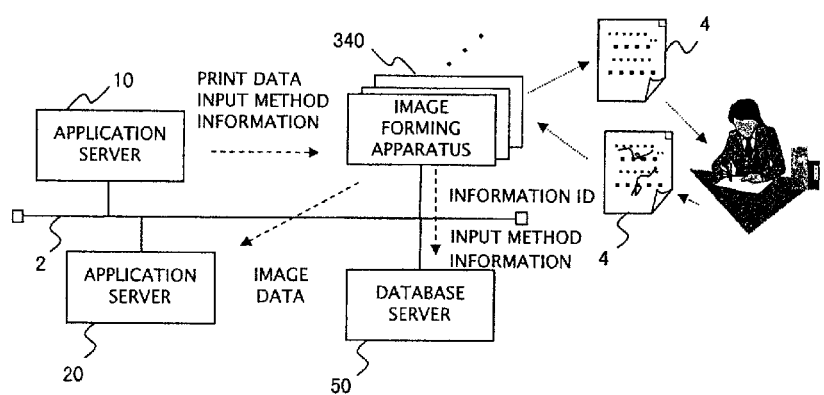
FIG. 17 is an entire configuration diagram illustrating the print medium processing system of an exemplary embodiment 4.
Figure 18:
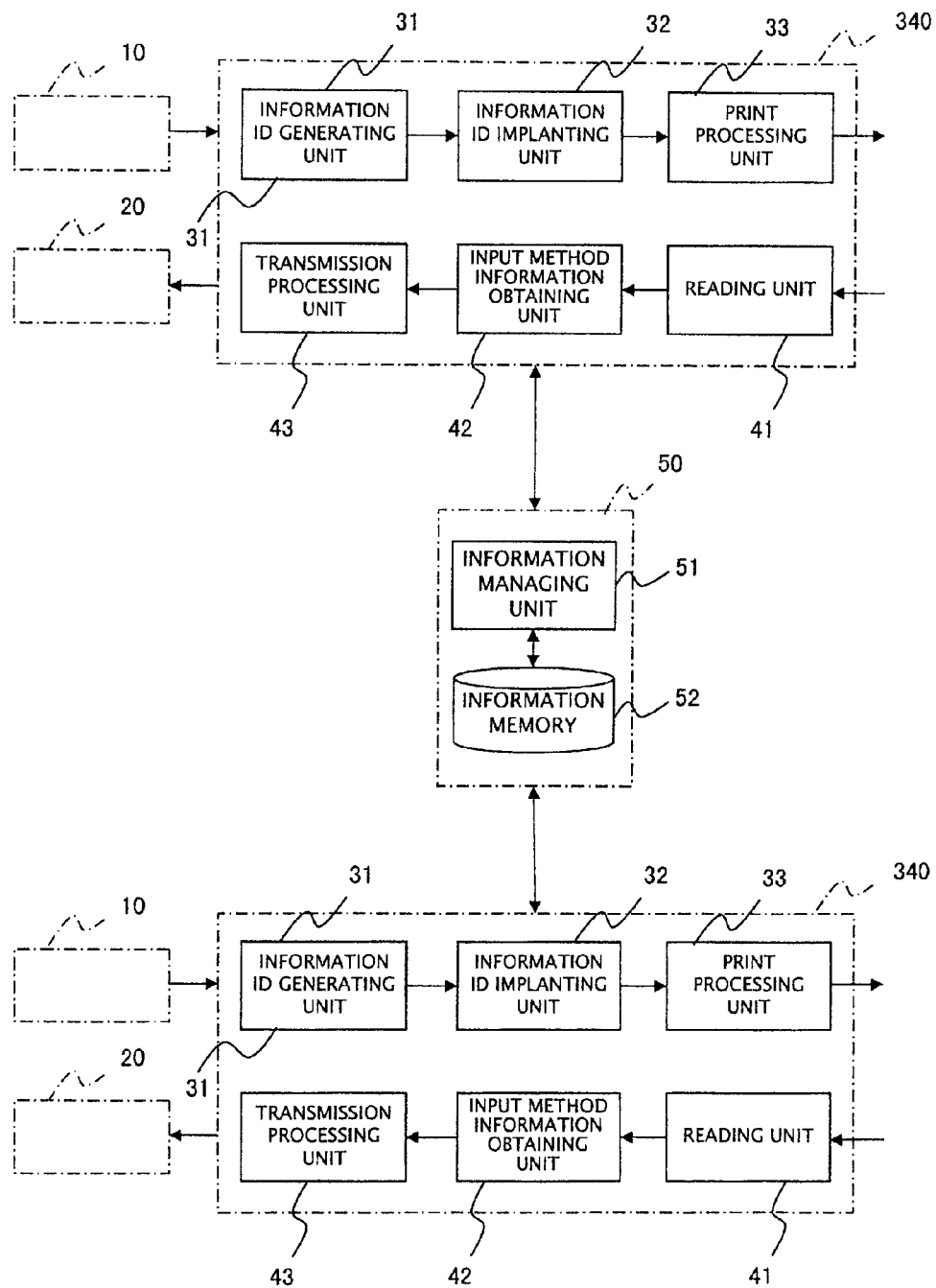
FIG. 18 is a block configuration diagram illustrating the print medium processing system of the exemplary embodiment 4.

FIG. 17 is an entire configuration diagram of a print medium processing system of the present exemplary embodiment, and FIG. 18 is a block configuration diagram illustrating the print medium processing system of the present exemplary embodiment. In the above exemplary embodiment 1, an image forming apparatus which realize a printing function and a reading function are described as separate apparatus. In the present exemplary embodiment, one image forming apparatus 340 includes both functions of processing for printing to a form and processing for reading a form, which are described by using each of the flowcharts illustrated in FIG. 6 and FIG. 9 in the exemplary embodiment 1. If such an image forming apparatus 340 is connected to the network 2, a user can print and read using any image forming apparatus 340, so that it is not necessary to select an apparatus.

In addition, other units of the information ID generating unit 31 and the information ID implanting unit 32 may be mounted in a client computer used by a user, and the client computer may print the print data with the QR code to a local printer or a printer connected to a network. Furthermore, a scanner which originally includes a scan function may be configured to include the input method information obtaining unit 42 and the transmission processing unit 43 instead of the image forming apparatus.

Exemplary Embodiment 5

Figure 19:
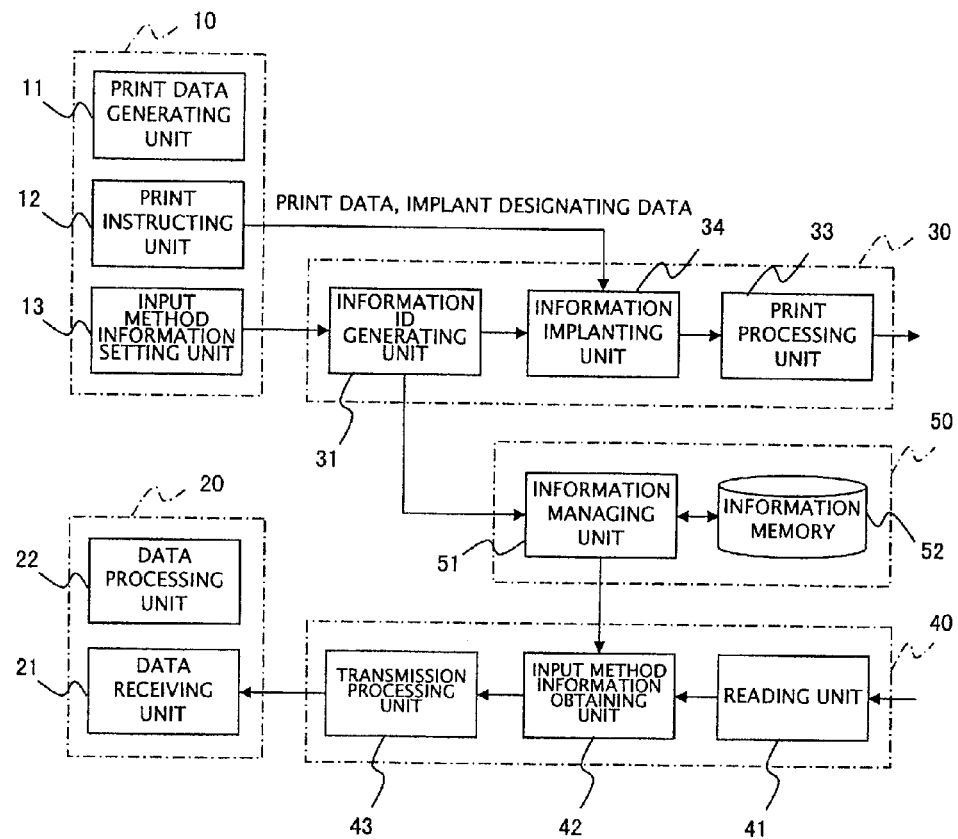
FIG. 19 is a block configuration diagram illustrating the print medium processing system of an exemplary embodiment 5.

FIG. 19 is a block configuration diagram illustrating a print medium processing system of the present exemplary embodiment. The present exemplary embodiment is characterized by causing the application server 10 to be able to designate implant designating data separately from the print data. The implant designating data is data which an application instructing the printing for the print data causes the image forming apparatus 30 to implant and print, like the information ID, in order to transfer to an application inputting the read image data. For example, business negotiation number data which a business negotiation management system uses to manage each business negotiation is implanted in documents such as an estimate sheet, a bill statement, and a contract document, which are generated during the business negotiation. Meanwhile, in the present exemplary embodiment, it is assumed that the implant designating data is converted to the QR code to be printed like the information ID. Thus, the business negotiation number can be obtained by decoding the QR code of the business negotiation number from the read image data after the estimate sheet, etc. are stamped, so that an application of an inputting side can manage the estimate sheet, etc. as a series of documents relating to the business negotiation by using the business negotiation number.

The business negotiation management system, etc. which is operating, may not include a function which encodes the business negotiation number to the QR code, etc. and prints the QR code. Such a business negotiation management system needs development time and cost to be changed to adapt to the QR code printing. In addition, it is desired to not stop a system when the function is introduced. In the present exemplary embodiment, even in such a case, the business negotiation number transferred from the application server 10 is received as the implant designating data, and is converted to the QR code and printed, so that it becomes possible to input the image data which is obtained by scanning to an application of the business negotiation management system together with the business negotiation number.

Returning to FIG. 19, the present exemplary embodiment includes an information implanting unit 34 instead of the information ID implanting unit 32 of the exemplary embodiment 1. This is because the implant designating data is implanted in the print data in addition to the information ID. That is, the information implanting unit 34 includes a function of an implant designating data implanting unit which implants the implant designating data in the print data in addition to a function of the information ID implanting unit 32 which implants the information ID.

FIG. 20 is a diagram illustrating an example of an estimate sheet printed by the image forming apparatus 30 of the present exemplary embodiment. As illustrated in FIG. 20, at the upper and right area of the estimate sheet, a QR code 61 of the implant designating data is printed in line with the QR code 6 of the information ID. While the size and number of the implant designating data may be arbitrary, the size of a blank space in which an encoded image is printed is different depending on the print data, so that the implant designating data is implanted within the size of the blank space. In FIG. 20, an example is illustrated where only one implant designating data is implanted, whose length is fixed at 128 bits.

For example, in the business negotiation management system, the image data of the estimate sheet can be stored in a file server according to the corresponding business number simply by scanning the estimate sheet exemplified in FIG. 20 before making a proposal to a client. In one business negotiation, even when the estimate sheet is issued several times, it can be managed by each business negotiation, so that the business efficiency is improved. Furthermore, as this is also the same in the management of a bill statement, the image data of the bill statement can be stored in the file server according to the corresponding business number simply by scanning a bill statement in which the QR code of the business negotiation number is printed before making a proposal to a client. By referring to transactions related to money received on subsequent days with the same business negotiation number, secure payment collecting management can be executed.

Meanwhile, as described above, the present exemplary embodiment can be applied to all of a variety of documents such as a delivery slip, a receipt, and a contract document, which are handled with a client, depending on the progress of the business negotiation.

According to the present exemplary embodiment, aside from the information ID which designates an input method to an application, data which needs to be utilized by an application, such as the business negotiation number, can be implanted and printed on a form as the implant designating data, so that data of a desired application can be flexibly passed.

Meanwhile, in the present exemplary embodiment, while the QR codes of the information ID and the implant designating data are generated separately because the utilization objects are different from each other, the same QR code may be assigned to both data.

Exemplary Embodiment 6

Figure 21:
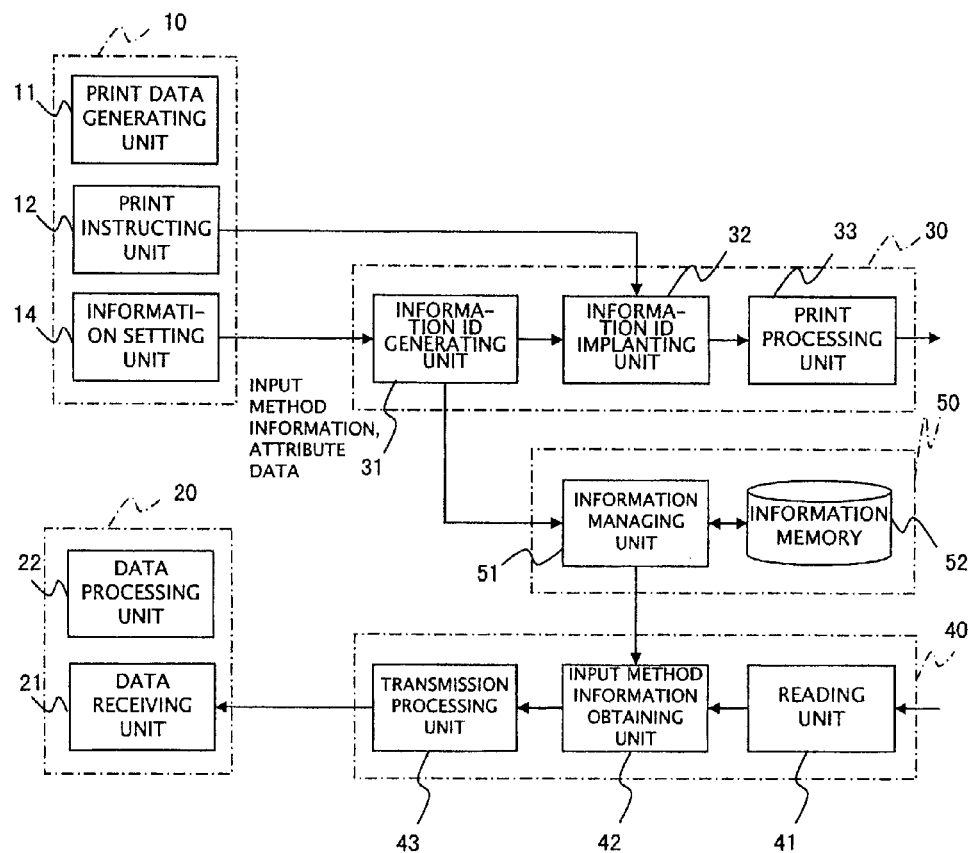
FIG. 21 is a block-configuration diagram illustrating the print medium processing system of an exemplary embodiment 6.

FIG. 21 is a block configuration diagram illustrating a print medium processing system of the present exemplary embodiment. The present exemplary embodiment is characterized by causing the application server 10 to be able to designate attribute data aside from the input method information. The attribute data is data which an application of a side instructing the printing needs to transfer, together with the image data, to an application of an inputting side. The attribute data is data which is additionally transferred to the application of an inputting side like the implant designating data used in the exemplary embodiment 5. However, the implant designating data is data designated by an application which instructs the printing, and is data which is encoded and added to the print form, while on the other hand, the attribute data is data which a user designates, like the input method information, and is data which is stored and managed together with the input method information in the information memory 52.

For example, a file whose file name is "A", which is handled by an application, is printed as the print data, and a file name of the read image data generated by scanning the print data is set to "A_image", so that the original print data and the read image data may need to be associated with each other by using the original name "A". The attribute (sometimes referred to as meta data) of each application is frequently attached to the print data from the application. For example, for security reasons, a user name or a group name which are accessible may need to be attached to the data, and a user ID of a print client and a history such as a print time may be attached as an attribute to the scanned image. The number of such attribute data is likely to increase, so that it can be easily imagined that it may become difficult to allocate all the attribute data in a print form because of a lack of free space in the print form.

In the present exemplary embodiment, an information setting unit 14 is provided instead of the input method information setting unit 13 of the exemplary embodiment 1. This is because the attribute data is transferred to the image forming apparatus 30 in addition to the input method information. That is, the information setting unit 14 includes a function which causes the image forming apparatus 30 to set the attribute by transferring the attribute data in addition to a function of the input method information setting unit 13.

When the input method information is transferred from the application server 10, the information ID generating unit 31 of the image forming apparatus 30 generates the identification information (information ID) of the input method information, and transfers together with the corresponding input method information to the database server 50, but in the present exemplary embodiment, further, the attribute data is also transferred.

FIG. 22 is a diagram illustrating a data configuration and also a data setting example of information which is set and registered in the information memory 52 of the present exemplary embodiment. When receiving information transferred from the image forming apparatus 30, the information managing unit 51 associates the input method information with the information ID and registers the associated information in the information memory 52, but in the present exemplary embodiment, as illustrated in FIG. 22, the attribute data is also registered in association with the information ID. While the attribute data is arbitrary, in this example it includes a file name of a scanned image file, an access right, a classification for the security of documents, a printing date, a printing demander, a retrieval keyword, and a person in charge of generating documents. Of course, as illustrated in the third record of FIG. 22, the attribute data is not necessarily included in data to be stored.

In the present exemplary embodiment, a document management system will be shortly described as an example. The document management system executes access control to each document, history management such as when, where and who has handled a document, function management for indexing to a document and retrieving the indexed document, and security management such as safely storing a document. The attribute data includes data used for such a variety of management. Meanwhile, the document management system includes a variety and large amount of attribute data, and executes a variety of management like this example. Here, the document refers to a file of an application, for example, a file by Office (trademark) (Word, PowerPoint, etc.) of Microsoft, paper to which the file is printed, and image data generated by scanning the paper.

The document printed for a conference, etc. is frequently scanned to be stored as the image data after the conference, and is shared among members of the conference. Therefore, in recent years, it has been natural to promote effective utilization by promoting sharing of information. However, while the attribute information of conference documents sometimes needs to be known, such information is not printed on a form, so that an application can not obtain the information.

Thus, when obtaining the input method information based on the information ID specified from the read image data, and the attribute data exists which is associated with the information ID, the image forming apparatus 40 of the present exemplary embodiment obtains the attribute data together with the input method information. The image forming apparatus 40 can transfer the attribute data together with the read image data to the application server 20 running an application which can be specified from the input method information, so that the image forming apparatus 40 can notify the application side of the attribute information of conference documents.

The application can execute desired data processing, such as storing the image data according to information included in the attribute data. For example, in the case of the document management system, a file name in the attribute data is designated as a file name of the inputted image data to be stored, the corresponding access management is executed based on the attribute data, and the attribute data is registered to a retrieval index. Thereby, the image data can be appropriately managed and utilized. The attribute data can be utilized as needed. For example, a user is allowed to recognize the attribute of the form by displaying the attribute data.

Figure 23:
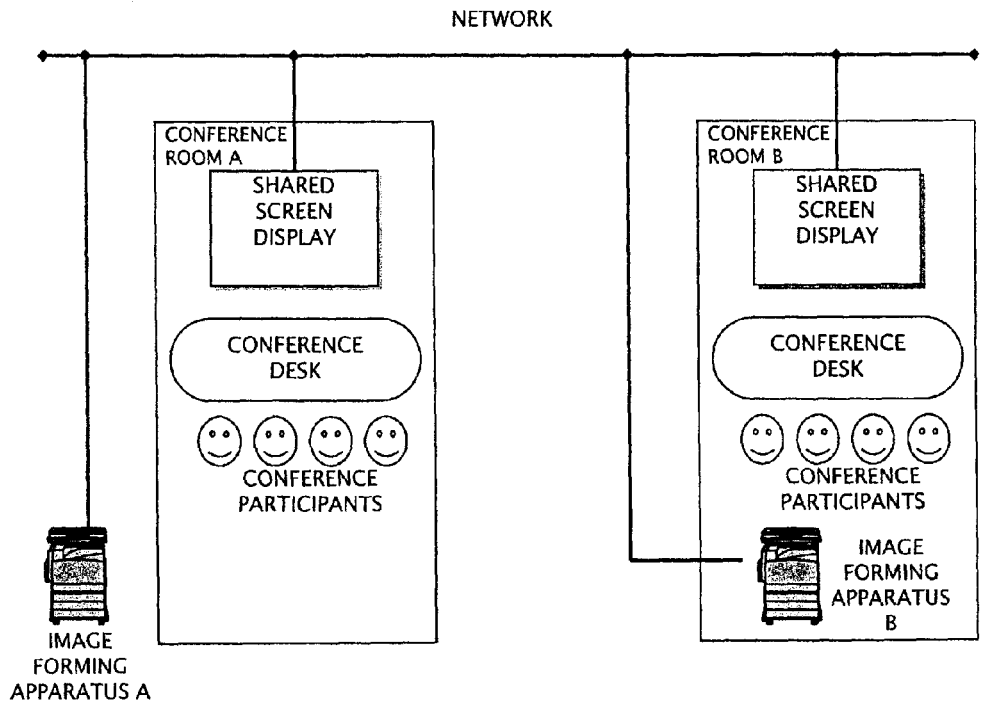
FIG. 23 is an entire configuration diagram illustrating a remote conference system of the exemplary embodiment 6.
Figure 24:
FIG. 24 is a diagram illustrating a screen display example printed by the image forming apparatus of the exemplary embodiment 6.
Figure 26:
FIG. 26 is a diagram illustrating that something is written on the print form illustrated in FIG. 24.

As another example, in a remote conference application as illustrated in FIG. 23, a document is displayed on a writable shared screen display, and such document displaying operation and document writing operation are shared by plural locations. In such a remote conference application, arbitrary and plural locations can be connected according to conference participants, but the time and location where a conference is being held are changed every time, so that conference participants, conference documents, each conference room, and a shared screen display and an image forming apparatus which are placed in the room are managed in association with a conference entity ID, and as a result a method is adopted where confusion is avoided among the plural conferences. Incidentally, an electronic document is printed which is shared on a shared screen display during a conference, and after being manually written, the printed paper is scanned, and the scanned document is displayed again on the shared screen display to be shared with other conference participants, and as a result, the discussion may need to be deepened. In such a case, the remote conference application designates the corresponding displayed page as the print data, sets the own remote conference application to an input destination address designated by the input method information, and transfers the attribute data as the conference entity ID to the present system illustrated in FIG. 21. Thus, in the present exemplary embodiment, as exemplified in FIG. 24, the sheet generated by providing the information ID to the print data is printed by the image forming apparatus A which is closest to a conference room A. Here, the image forming apparatus A is shared with normal office operation, so that it is assumed that the image forming apparatus A is not placed in the conference room. As the fifth record of information illustrated in FIG. 25, it is assumed that the information memory 52 stores the conference entity ID: "857495786" as the attribute data corresponding to the information ID. Here, after writing necessary items in the sheet as exemplified in FIG. 26, the conference participant scans the sheet with the closest image forming apparatus A. The image forming apparatus A corresponding to the image forming apparatus 40 of the present exemplary embodiment transfers the scanned image data, and the conference entity ID specified from the information ID included in the read image, to the remote conference application specified from the corresponding input method information. Thereby, the remote conference application displays the inputted image data in the shared screen display associated with the corresponding conference.

As described above, even if the image forming apparatus is shared with another operation, and the remote conference application concurrently manages plural conferences in parallel, it become possible to smoothly continue a discussion which utilizes printed sheets in each conference.

Meanwhile, each of the exemplary embodiments described above may be implemented in an appropriately combined manner. In such a case, the information ID needs to be uniquely generated without any overlapping even if the information ID is generated by a system configuration of any exemplary embodiment, and the information memory 52 referred by each system needs to be logically single, that is, to be shared. With such a configuration, it becomes possible to implement each of the exemplary embodiments in a combined manner.

Exemplary Embodiment 7

In each of the above exemplary embodiments, as described in the exemplary embodiment 1, in processing where slips are printed, item data is manually inputted each time, which is necessary to set the input method information. The input method information is configured with plural kinds of item data, so that the setting is complex, and the input method information may be inputted by mistake. Thus, in the present and subsequent exemplary embodiments, an interface unit is provided which is convenient to set a variety of item data included in the input method information, so that the convenience of a user can be promoted. First, in the present exemplary embodiment, the input method information can be conveniently set by efficiently utilizing a printer icon which is an example of the interface units.

Figure 27:
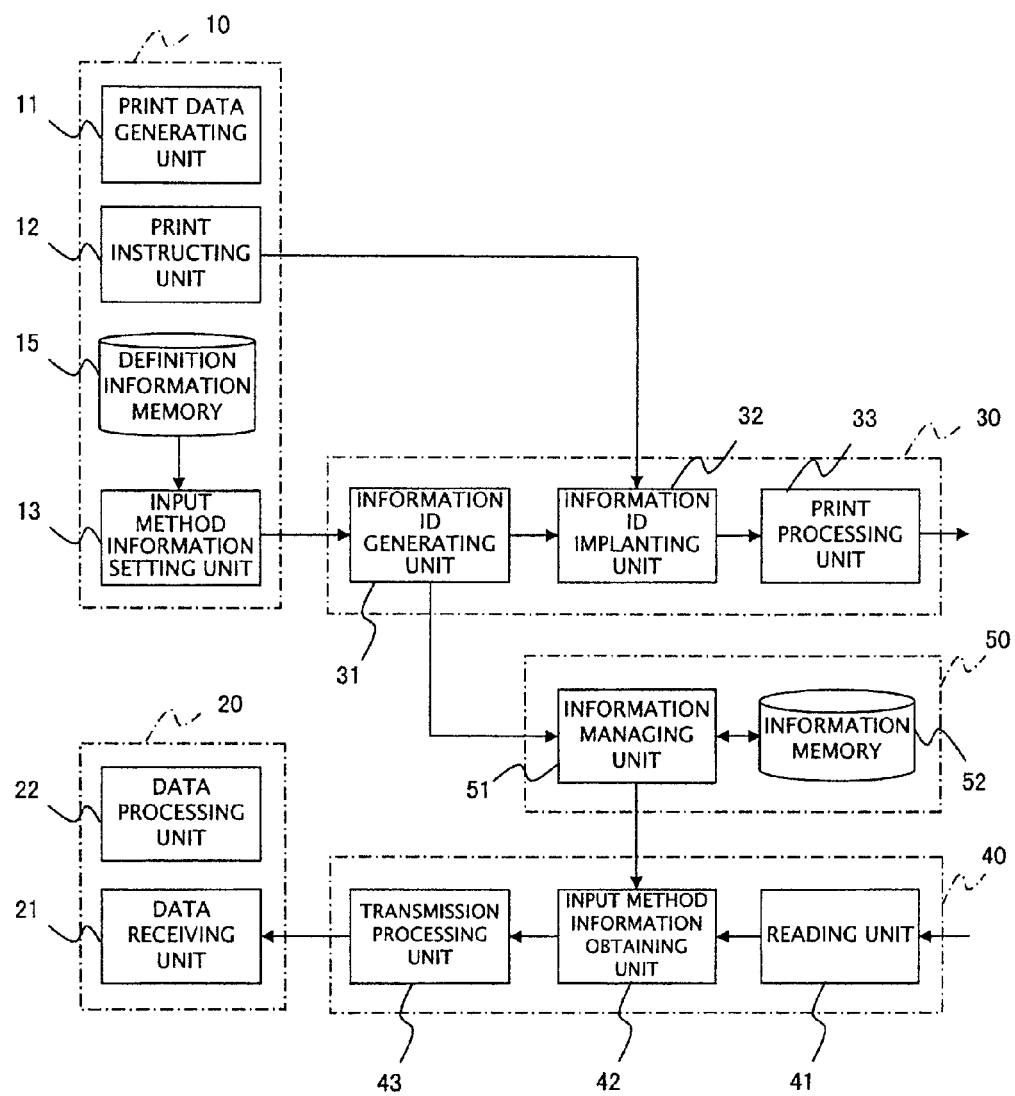
FIG. 27 is a block configuration diagram illustrating the print medium processing system of an exemplary embodiment 7.

FIG. 27 is a block configuration diagram illustrating a print medium processing system of the present exemplary embodiment. The present exemplary embodiment is configured by adding a definition information memory 15 to the configuration illustrated in the exemplary embodiment 1. FIG. 28 is a diagram illustrating a data configuration of definition information of the input method information, which is set and registered in the definition information memory 15 of the present exemplary embodiment. As described above, each information such as an input destination address, a protocol, and an error processing method, which are illustrated in FIG. 28, is included in the input method information. Meanwhile, FIG. 28 is illustrated so as to clarify that the input destination address included in the input method information is configured with a computer name and a shared folder name.

FIG. 29 is a diagram illustrating a display example of the printer icon which is previously provided to set the input method information in the present exemplary embodiment. In the present exemplary embodiment, before starting utilization of the present system, the icons exemplified in FIG. 29 are generated, and each icon is associated with the definition information of the input method information, which is exemplified in FIG. 28. That is, the printer icons are provided whose number is the same as the number of the input method information which needs to be previously provided. Furthermore, a shared folder is also previously generated, which is a storing destination of the print data. Meanwhile, while an example is illustrated in FIG. 29 where six icons are previously generated, only the definition information for the three icons are exemplified in FIG. 28. Meanwhile, it is assumed that a user of the present system understands the setting content of the input method information associated with each icon.

Figure 6:
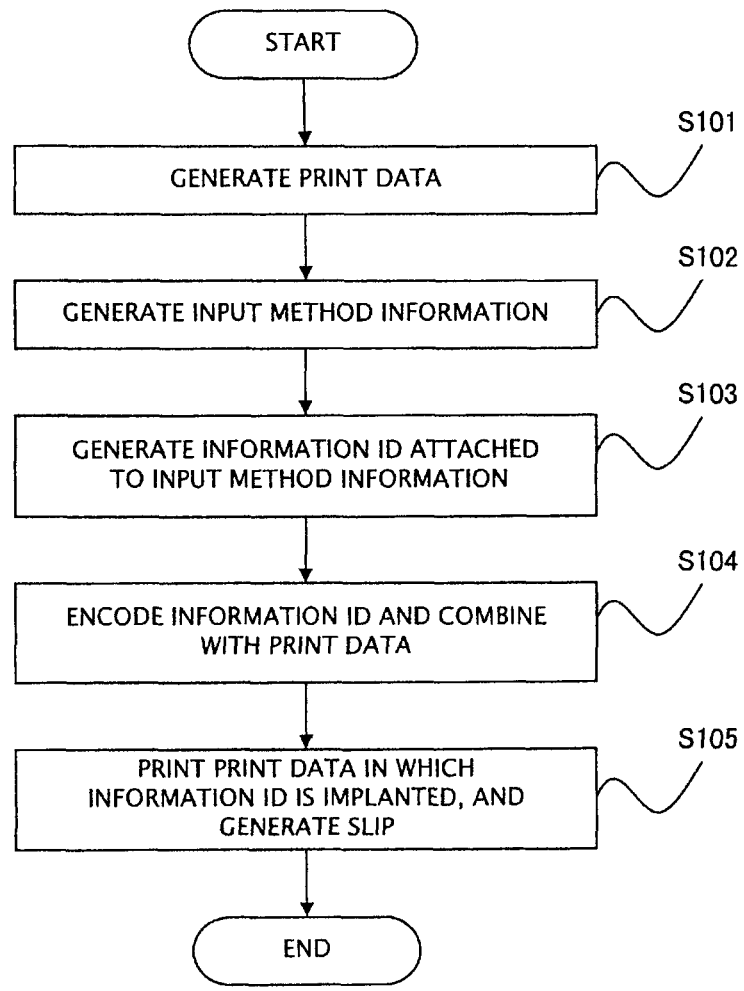
FIG. 6 is a flowchart illustrating processing until printing a slip in the exemplary embodiment 1.

The operations of the present exemplary embodiment will be described below, which is implemented after the above previous providing. The operations of the present exemplary embodiment may be basically the same as that of the exemplary embodiment 1, so it will be described according to the flowchart illustrated in FIG. 6. In the present exemplary embodiment, steps 101 and 102 of FIG. 6 are slightly different from those of the exemplary embodiment 1.

That is, in the exemplary embodiment 1, when the slip data is generated as the print data by writing necessary items such as a delivery destination in a slip of a predetermined form, the slip data to be printed is transferred to the image forming apparatus 30, and the input method information is generated which includes the item data inputted by a user to be transferred to the image forming apparatus 30. As described above, the slip data is transmitted to the image forming apparatus 30 by instructing the printing from an application, etc. which operates in the application server 10.

On the other hand, in the present exemplary embodiment, when the slip data is generated as the print data by writing necessary items such as a delivery destination in the slip of a predetermined form, the user selects the slip data, and instructs the printer to print, which is specified by any one of the icons exemplified by FIG. 29. That is, the user specifies the print data, the print instruction destination, and the input method information all together with a Drag & Drop operation.

When the Drag & Drop operation is executed by the user, the input method information setting unit 13 displays a print detail screen in a screen, reads each item data of the input method information from the definition information memory 15, which is associated with the icon selected by the user, and displays in the corresponding input output field on the print detail screen. A display example of the print detail screen in this case is illustrated in FIG. 30. When the user clicks the OK button after confirming the displayed content of the input method information, the application server 10 transmits the slip data to be printed, and the input method information including each item data displayed in a screen to the image forming apparatus 30.

The processing after receiving the print data and the input method information in the image forming apparatus 30 may be the same as that of each of the above exemplary embodiments, so the description will be omitted. FIG. 31 is a diagram illustrating a data configuration of information which is set and registered in the information memory 52 of the present exemplary embodiment. In the information memory 52, as in the exemplary embodiment 1, the information ID generated by the information ID generating unit 31 is added to the input method information transferred from the application server 10 to be registered.

According to the present exemplary embodiment, the input method information is previously set to be associated with the icon by an administrator, so that simply by causing the user to select the icon with which the input method information is associated, the input method information can be easily set for the slip data to be printed. In addition, it is not necessary to input the input method information every time the printing is requested, so the possibility of an input mistake being induced can be reduced. The input method information which is previously set can be changed when the printing is requested, so the input method information can be flexibly set.

Exemplary Embodiment 8

The image forming apparatus 40 transmits the image data read by the scanner 314 to the application server 20 which can be specified by the input method information, and at this time, the image data may need to be accumulated in a shared folder. The present exemplary embodiment is characterized by enabling a name of the shared folder to be automatically set from a name of a file, which is one of attribute information of a file.

Figures 32A, 32B, 32C:
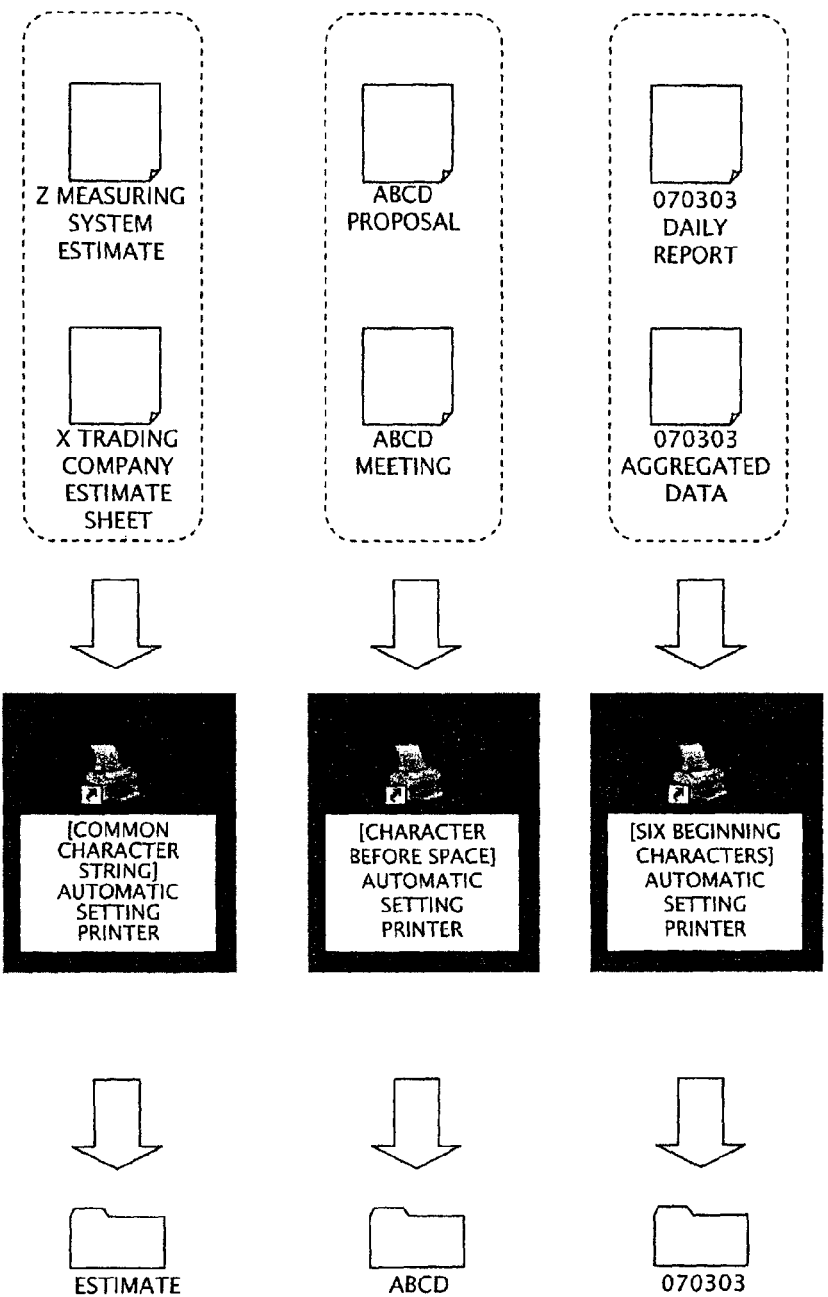
FIG. 32A, FIG. 32B, and FIG. 32C are conceptual diagrams which are used to describe a method which sets the input method information in an exemplary embodiment 8.

FIGS. 32A to 32C illustrate conceptual diagrams illustrating the characteristics of the present exemplary embodiment. In FIGS. 32A to 32C, each icon of files and printers which are illustrated on a desktop is illustrated, and three examples are illustrated with a name of the shared folder automatically set to each of two files.

First, an example is illustrated in FIG. 32A where a character string is automatically extracted, which is commonly included in names of two files to be shared, and the character string is automatically set as a name of the shared folder. That is, when two files surrounded with a dash line in FIG. 32A are selected, and are Drag & Dropped on the printer icon which is used to extract a common character string, the input method information setting unit 13 extracts a common character string, i.e. [estimate], and automatically sets the common character string as a name of the common folder.

Next, an example is illustrated in FIG. 32B where from each name of two files to be shared, a character string is automatically extracted, which is commonly included before a space (blank character), and the character string is automatically set as a name of the shared folder. That is, when two files surrounded with a dash line in FIG. 32B are selected, and are Drag & Dropped on the printer icon which is used to extract a character string before a space, the input method information setting unit 13 extracts character strings before a space, and automatically sets the character string which commonly exists in the character string, i.e. [Mr./Mrs. ABCD] as a name of the common folder.

For example, as exemplified in FIG. 32B, it is convenient to manage the read image data relating to the same client as a file in the same folder. The present exemplary embodiment is convenient for such a utilizing method. Meanwhile, as already described in the above exemplary embodiment 1, the read image data is image data which is read from an image in a form by the image forming apparatus 40 after the image is written in the form printed by the image forming apparatus 30.

An example is illustrated in FIG. 32C where a character string including six beginning characters is automatically extracted from each name of two files to be shared, and the character string is automatically set as a name of the shared folder. That is, when two files surrounded with a dash line in FIG. 32C are selected, and are Drag & Dropped on the printer icon which is used to extract the six beginning characters, the input method information setting unit 13 automatically sets the character string of six characters from the beginning, i.e. [070303], as a name of the common folder.

For example, as exemplified in FIG. 32C, when a file is managed with a file name as including the date, it is convenient for the files whose dates are the same as each other to be managed in the same folder.

Meanwhile, in the present invention, a configuration example is illustrated where each of such above extracting rules is set having one item data, which is a shared folder name included in the input method information, extracted from a character string forming a file name which is one of the attribute information of the file, and set, and a user selects each of the set extracting rules by using the corresponding printer icons respectively. However, the printer icons may be appropriately set according to applications and operations of systems, for example, the printer icon which steadily sets a shared folder name, e.g. [estimate], and the printer icon which sets six characters from the tail end.

In the present exemplary embodiment, it is assumed that the application server 10 generating the slip data, and the application server 20 processing the read image data, are the same computer, so it is assumed that the shared folder is automatically generated on the desk top by using the shared folder name, which is automatically set. Of course, the shared folder may be generated at another location than the desk top by setting in more detail.

Meanwhile, in the present exemplary embodiment, while it is exemplified that the input method information relating to the shared folder is automatically set, it can be applied to automatically set another input method information, and the input method information for plural items. As the attribute information of a file, it is also possible to automatically set not only a file name, but also the item data which can become the input method information from another attribute information, such as a generation date and a generating person. Other input method information which is not automatically set may be manually inputted as in the exemplary embodiment 1, and may be utilized by combining with the exemplary embodiment 7.

Exemplary Embodiment 9

In the above exemplary embodiment 8, the shared folder is generated as a storing destination of the read image data processed by an application mounted in the application server 20, and a name of the folder is automatically set by referring to a file name of the slip data. Also, the shared folder is generated on a desk top. In the present exemplary embodiment, an example will be described where the read image data is set to be stored in an after-mentioned location except the desk top.

Figure 33:
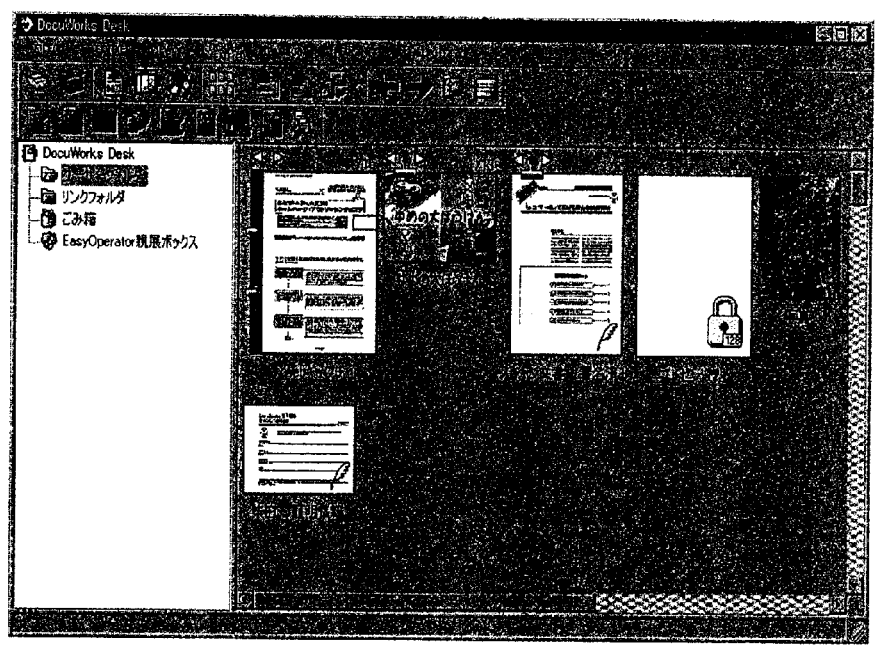
FIG. 33 is a diagram illustrating a screen display example when content of a work folder is displayed, which is included by a document handling software, and in which the read image data is stored, in an exemplary embodiment 9.
Figure 35:
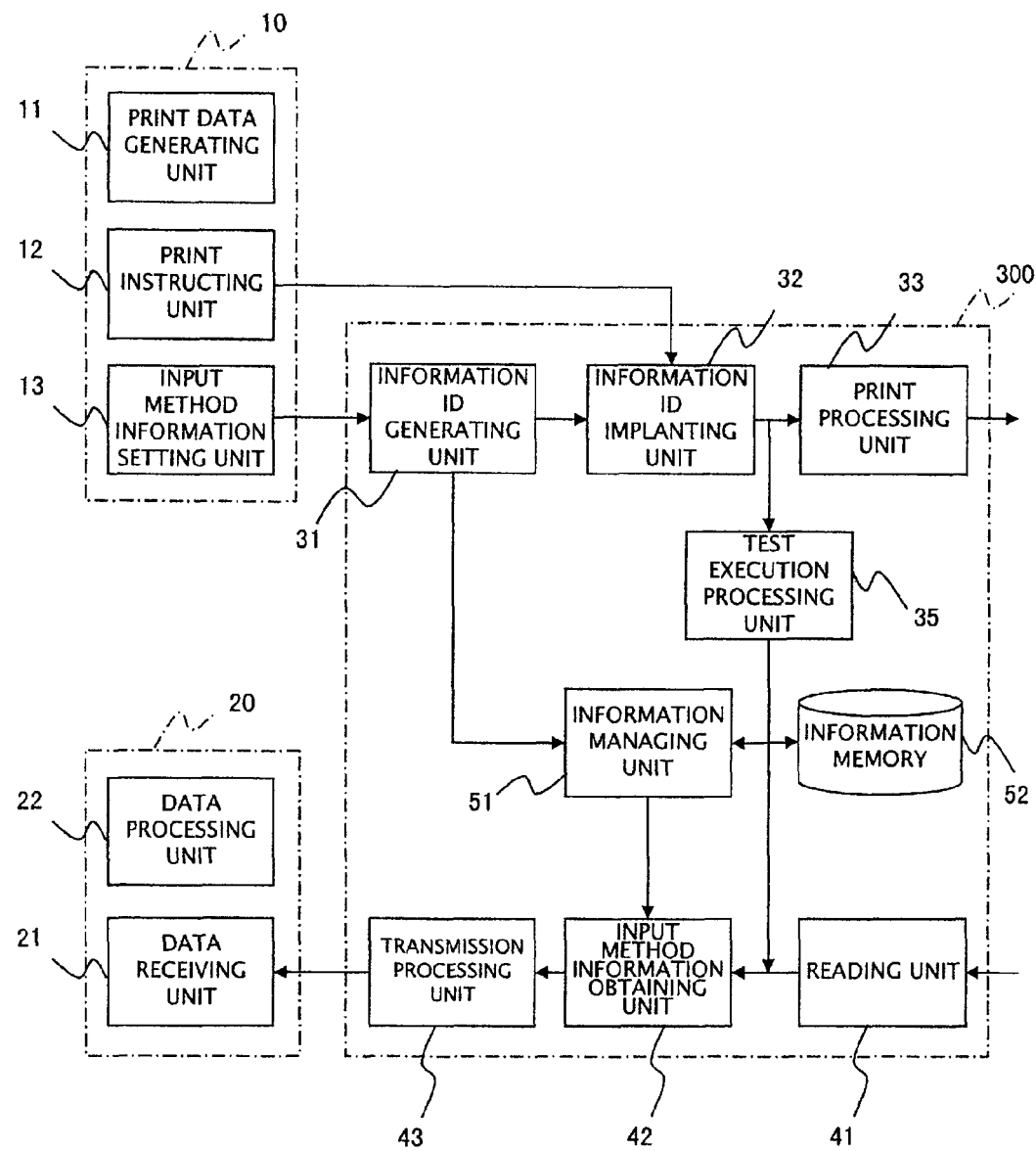
FIG. 35 is a block configuration diagram illustrating the print medium processing system of an exemplary embodiment 11.

FIG. 33 is a diagram illustrating one screen display example of work folders provided by Docuworks of Fuji Xerox Co., Ltd as an example of the document handling software. The Docuworks of Fuji Xerox Co., Ltd maintains and manages document files managed by this software in the work folders, and when the printing function is selected from a pull down menu displayed by clicking [file] of a menu bar, a desired document file can be printed from the image forming apparatus 30.

Incidentally, when the slip data to be printed is generated by using the document handling software the read image data corresponding to the slip data is often introduced to the same document handling software, and is processed. Thus, in the present exemplary embodiment, the shared folder is not automatically generated, differing from the above exemplary embodiment 8, and any one of the work folders managed by the software which generates the slip data to be printed, e.g. a folder which is in a root directory, is automatically set as the shared folder. Thereby, when the same software process generates the slip data, it is convenient for the read image data by the image forming apparatus 40 to be directly introduced to the work folder provided by the software.

Meanwhile, in the above description, while the Docuworks of Fuji Xerox Co., Ltd is exemplified, the same operations can be also executed by ArcSuite Office, also of the Xerox company. In addition, the same operations can be also executed by other document handling software.

Exemplary Embodiment 10

For example, the item data is often managed by the file which depends on the spread sheet application such as CSV (Comma Separated Value) file and Excel of Microsoft. The input method information used in each of the above exemplary embodiments may also be managed in the spread sheet by such files. Thus, the present exemplary embodiment is characterized by causing the input method information managed in the spread sheet to be able to be efficiently utilized.

FIG. 34 is a diagram illustrating a data configuration example of the input method information managed in the spread sheet in the present exemplary embodiment. In FIG. 34, each record is configured as a combination of the print document information, the input method information, and the attribute information, and is set in each slip to be printed. The print document information includes the identification information of a document to be printed, is configured with information relating to the document, and in the example illustrated in FIG. 34, includes a file name of the document and a folder name which specifies the location in which the document is stored. The input method information is the same as described above. The attribute information is information which is added to the printed slip with the QR code, and includes the implant data described in the exemplary embodiment 5 and the attribute data described in the exemplary embodiment 6. In the present exemplary embodiment, the attribute information includes a file name which is assigned to the read image data of the written slip, and the storing location and the implant data of the client information, which are utilized as a retrieval index.

In the present exemplary embodiment, the slip data to be generated in step 101 in FIG. 6 is stored in a location specified from the print document information. In the present exemplary embodiment, the input method information corresponding to the slip data is extracted from a table as referring to the identification information which is a file name of the slip data, and is set as the input method information of such slip data. The application server 10 further extracts such information and also the corresponding attribute information from the table to transmit to the image forming apparatus 40. As a result, the slip data is printed and a slip is generated, and the description of the following processing will be omitted since it is described in the above exemplary embodiments 1, 4, and 6.

Exemplary Embodiment 11

In the print medium processing system described in each of the above exemplary embodiments, the written content and also the printed slip can be confirmed by printing the slip and reading the written slip. In addition, it can be confirmed by the desired application server 20 that the slip is correctly inputted. However, it may need to be confirmed before actually delivering a large amount of printed material whether or not the above processing based on the input method information is correctly implemented. Thus, in the present exemplary embodiment, a test execution processing unit 35 is provided so that such a test can be executed. Meanwhile, it is convenient to describe by using one image forming apparatus 300 which executes both of the printing and reading, so that in the present exemplary embodiment, the system configuration is formed by providing the test execution processing unit 35 in the system configuration of the exemplary embodiment 2. Of course, the system can be also configured so that the processing of functions of the test execution processing unit 35 is divided to the processing which receives the image data to be printed, and the processing which transmits the image data for the test, and is mounted in the image forming apparatus 30 and the image forming apparatus 40 which are illustrated in the exemplary embodiment 1 respectively.

Next, operations of the present exemplary embodiment will be described mainly in the characteristic part of the present exemplary embodiment. As described above, the slip data to be printed is added with the information ID, and is subsequently transmitted to the print processing unit 33 to be printed. In the present exemplary embodiment, the slip data to be printed is also transmitted to the test execution processing unit 35 at the same time. Meanwhile, since it is not necessary to actually print during the test, when the test is executed, the print control may be executed so that the slip data is not transferred to the print processing unit 33 by controlling a switching to a test mode.

When the slip data is transferred to the test execution processing unit 35, the test execution processing unit 35 adds data indicating that the slip data is test data to the slip data, and transmits the slip data to the input method information obtaining unit 42. As it is sufficient to recognize that the read image data is used for the test, the data which means that it is the test data may be character data which is, for example, [test] in a space to be written.

When the image data for the test is obtained instead of the read image data, which is transferred from the test executing processing unit 35, the input method information obtaining unit 42 detects the QR code included in the image data, and decodes to extract the information ID. Meanwhile, the subsequent processing is as described in FIG. 9 in the exemplary embodiment 1, so that the description will be omitted.

As described above, a test can be executed before the processing based on the actual read image data is started, which checks whether or not the slip data generated by the application server 10 is transferred to the correct application server 20 according to the input method information, and is processed.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A print medium processing system, comprising:
an identification information generating unit that receives input method information, which specifies an application used to subsequently process transferred image data, and generates identification information for the received input method information;
an information memory that stores the input method information in a manner associated with the identification information;
a printing unit that adds the identification information of the input method information to original image data to be printed, and prints newly created image data, which includes the identification information and the original image data;
a reading unit that reads image data printed in a print medium by the printing unit;
an extracting unit that extracts the identification information from the image data read by the reading unit;
an obtaining unit that obtains the input method information from the information memory based on the identification information extracted by the extracting unit; and
a transferring unit that transfers the image data read by the reading unit to the application specified from the input method information obtained by the obtaining unit.

2. The print medium processing system according to claim 1, further comprising:
an updating unit that updates information stored in the information memory.

3. The print medium processing system according to claim 1, further comprising:
an additional information receiving unit that receives additional information to be inputted together with the read image data to the application.

4. The print medium processing system according to claim 1, wherein the input method information includes at least one of information relating to a protocol used when the read image data is transferred to the application and information relating to processing to be performed when abnormality occurs during the read image data is transferred.

5. The print medium processing system according to claim 1, wherein:
the identification information generating unit and the printing unit comprise a first image forming apparatus;
the reading unit, the extracting unit, the obtaining unit, and the transferring unit comprise a second image forming apparatus; and
the information memory comprises a database server.

6. The print medium processing system according to claim 1, wherein:
the identification information generating unit, the printing unit, the reading unit, the extracting unit, the obtaining unit, and the transferring unit comprise an image forming apparatus; and
the information memory comprises to a database server.

7. The print medium processing system according to claim 1, wherein:
the identification information generating unit comprises a first computer;
the printing unit comprises a printing apparatus;
the reading unit comprises a scanning apparatus;
the extracting unit, the obtaining unit, and the transferring unit comprise a second computer; and
the information memory comprises a database server.

8. The print medium processing system according to claim 1, further comprising:
an input method information memory that stores previously defined input method information; and
an input method information setting unit that sets the input method information by specifying at least one of the stored input method information.

9. The print medium processing system according to claim 8, wherein each of the input method information stored in the input method information memory is associated with an icon of the printing unit, and the input method information setting unit sets the input method information associated with the icon of the printing unit printing image data to be printed, the image data being selected by a user, as the input method information of the image data.

10. The print medium processing system according to claim 8, wherein the input method information setting unit includes a part of attribute information of image data file to be printed, the image data file being selected by a user, in the input method information set to the image data.

11. The print medium processing system according to claim 8, wherein if information about storage of the read image data is included in the input method information, a storage managed by an application software which generates the image data to be printed is used as the storage of the read image data.

12. The print medium processing system according to claim 8, wherein the input method information setting unit extracts the input method information corresponding to image data to be printed from a data file in a spread sheet format, the identification information and the input method information of the image data being associated with each other in the data file, and sets as the input method information of the image data.

13. A printing apparatus, comprising:
an input method information receiving unit that receives input method information which is referred to when image data is inputted to an application which processes the image data, said input method information including an input destination address of the application;
an identification information generating unit that generates identification information identifying the input method information, and associates the generated identification information with the input method information and registers the associated information in an information memory; and
a printing unit that adds the identification information of the input method information to image data and prints the image data to be printed;
said input method information including destination information identifying a destination to which image data, obtained from the printed image data, is to be input.

14. An information processing apparatus, comprising:
an extracting unit that receives image data obtained by reading a print medium, and extracts identification information from the image data, the identification information being provided to input method information which is referred to when image data is inputted to an application which processes the image data, said input method information including an input destination address of the application;
an obtaining unit that obtains the input method information specified with the extracted identification information from an information memory, which stores the identification information and the input method information associating with each other; and
a transferring unit that transfers the received image data to the application specified from the obtained input method information;
said input method information including destination information identifying a destination to which image data, obtained from the printed image data, is to be input.

15. A non-transitory recording medium storing a program causing a computer mounted in an image forming apparatus including a printing function to execute a process, the process comprising:
receiving input method information which is referred to when image data is inputted to an application which processes the image data, the input method information including an input destination address of the application;
generating identification information identifying the input method information, and associating the generated identification information with the input method information and registering the associated information in an information memory; and
adding the identification information of the input method information to the image data and printing the image data to be printed, the input method information including destination information identifying a destination to which image data, obtained from the printed image data, is to be input.

16. A non-transitory recording medium storing a program causing a computer mounted in an image forming apparatus including a reading function to execute a process, the process comprising:
receiving image data obtained by reading a print medium, and extracting identification information from the image data, the identification information being provided to input method information which is referred to when image data is inputted to an application which processes the image data, the input method information including an input destination address of the application;
obtaining the input method information specified with the extracted identification information from an information memory, which stores the identification information and the input method information associating with each other; and
transferring the received image data to the application specified from the obtained input method information, the input method information including destination information identifying a destination to which image data, obtained from the printed image data, is to be input.

17. A print medium processing system comprising:
an identification information generating unit that receives input method information, the input method information being referred to when image data is inputted to an application which processes the image data, and generates identification information for the received input method information, the input method information including an input destination address of the application;

an information memory that stores the generated identification information in a manner associated with the input method information;

a printing unit that adds the identification information of the input method information to image data to be printed, and prints the image data;

a reading unit that reads image data printed in a print medium by the printing unit;

an extracting unit that extracts the identification information from the image data read by the reading unit;

an obtaining unit that obtains the input method information specified by the identification information extracted by the extracting unit from the information memory;

a transferring unit that transfers the image data read by the reading unit to an application specified from the input method information obtained by the obtaining unit; and a test executing unit that receives image data to be printed by the printing unit, the identification information of the input method information being added to the image data, adds information that the image data is test data to the received image data, and transmits the image data to the extracting unit instead of image data read by the reading unit;

said input method information including destination information identifying a destination to which the read image data is to be input.

* * * * *